June 1, 1954   A. GREENFIELD   2,680,240
TELEMETERING SYSTEM
Filed Aug. 16, 1951   5 Sheets-Sheet 4

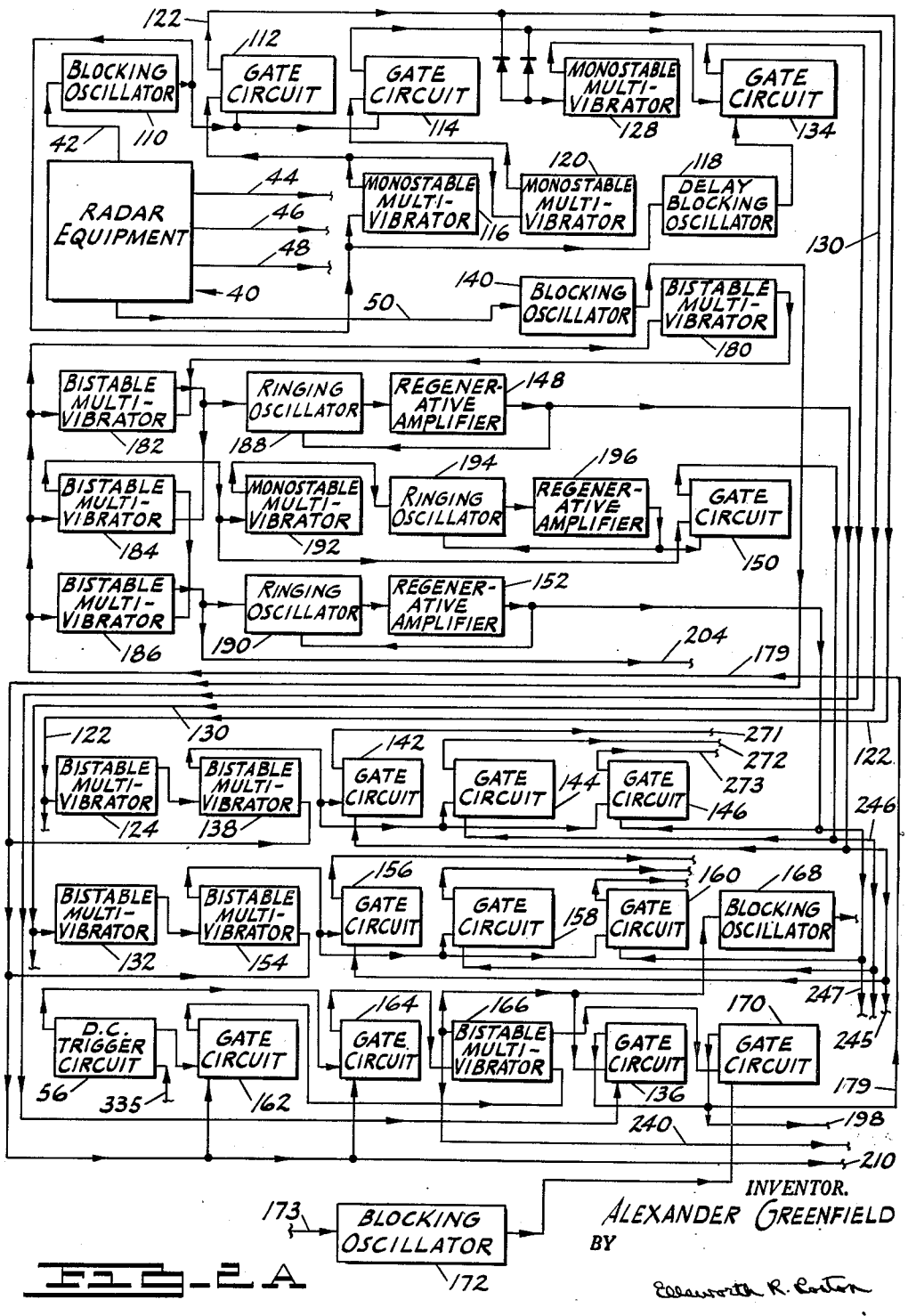

INVENTOR.
ALEXANDER GREENFIELD
BY
Ellsworth R. Roston
ATTORNEY

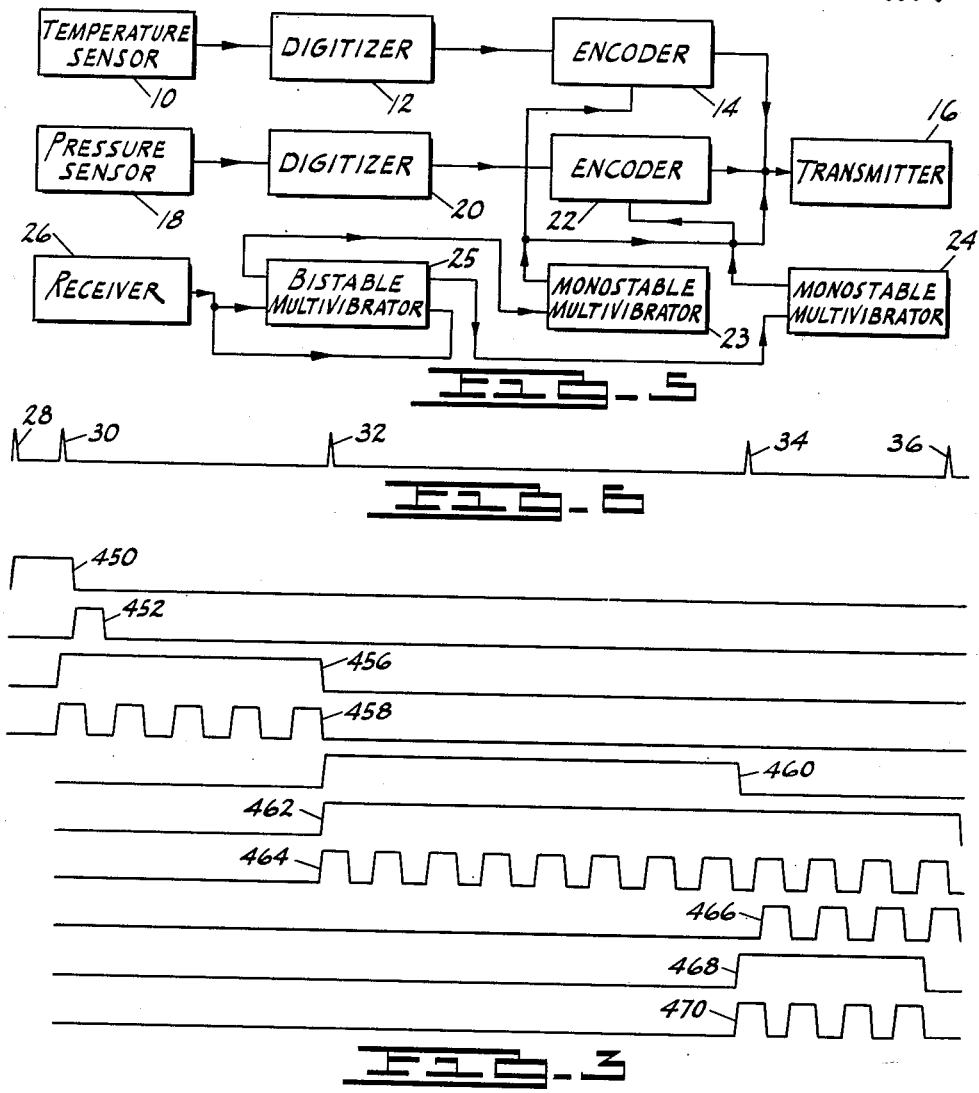

Patented June 1, 1954

2,680,240

UNITED STATES PATENT OFFICE 2,680,240

TELEMETERING SYSTEM

Alexander Greenfield, Bronx, N. Y., assignor to Bendix Aviation Corporation, Detroit, Mich., a corporation of Delaware Application August 16, 1951, Serial No. 242,121

30 Claims. (Cl. 340—183)

This invention relates to a system for operating on coded sequences of pulses to provide a written record of the information represented by the pulses. More particularly, the invention relates to an electrical system for decoding and recording information represented by sequences of pulses which are received at a central station and for correlating this recorded information with other information which is derived from the pulses received at the central station.

It has been found that information relating to certain meteorological conditions at different altitudes, such as air temperature and air pressure, is valuable in forecasting future weather conditions in a particular locality. To obtain these measurements, a rocket housing suitable measuring and transmitting equipment in its head is projected to an altitude of approximately 100,000 feet. The rocket head then becomes detached from the rocket body and, after detachment, drops away from the measuring and transmitting equipment, which floats slowly by parachute to the ground. During its descent, the equipment obtains measurements concerning the values of air temperature and air pressure and converts each of the measurements into a plurality of pulses spaced from one another in accordance with the values of the different digits in the measurement. The signals representing each measurement are transmitted to a ground station for decoding, recordation and analysis.

This invention provides a system at a central station for decoding the sequences of pulses which are received and for recording the information represented by the pulses. The system also operates to derive other measurements, such as wind direction and wind velocity, from the received sequences of pulses and also to derive a correlating measurement of the altitude at which the air temperature and air pressure are measured. The system operates in a positive and logical manner to record in sequence the information relating to each of the different conditions. A checking circuit is also provided to make certain that the information which is being received, decoded and recorded is correct.

An object of this invention is to provide a system for receiving, decoding and recording sequences of pulses relating to a plurality of different conditions at a distant position.

Another object of the invention is to provide a system of the above character for operating on coded sequences of pulses to convert the time separation between each pair of adjacent pulses in a sequence into an indication proportion to the time separation.

A further object is to provide a system of the above character for operating on sequences of received pulses representing certain conditions to derive measurements of other conditions for decoding, recordation and analysis.

Still another object is to provide a system of the above character for sequentially recording information relating to a plurality of conditions directly represented by received sequences of pulses and to a plurality of other conditions derived from the received sequence of pulses.

A still further object is to provide a system of the above character for checking the number of pulses in each received sequence and for eliminating the information represented by the sequence when the number of pulses received in the sequence is different from a predetermined value.

Other objects and advantages will be apparent from a detailed description of the invention and from the appended drawings and claims.

In the drawings:

Figures 2A, 2B and 2C are block diagrams which together constitute a somewhat detailed embodiment of the system shown in Figure 1;

Figure 3 illustrates curves of voltage wave forms at strategic terminals in the system shown in Figures 2A, 2B and 2C;

Figure 4 illustrates a tape on which information derived by the system shown in Figure 1 is recorded;

Figure 5 is a simplified block diagram of a system for measuring different conditions at a position removed from the central station and for transmitting the information in coded form to the system shown in Figure 1; and Figure 6 illustrates a representative sequence of pulses transmitted by the system shown in Figure 4.

Figure 1:
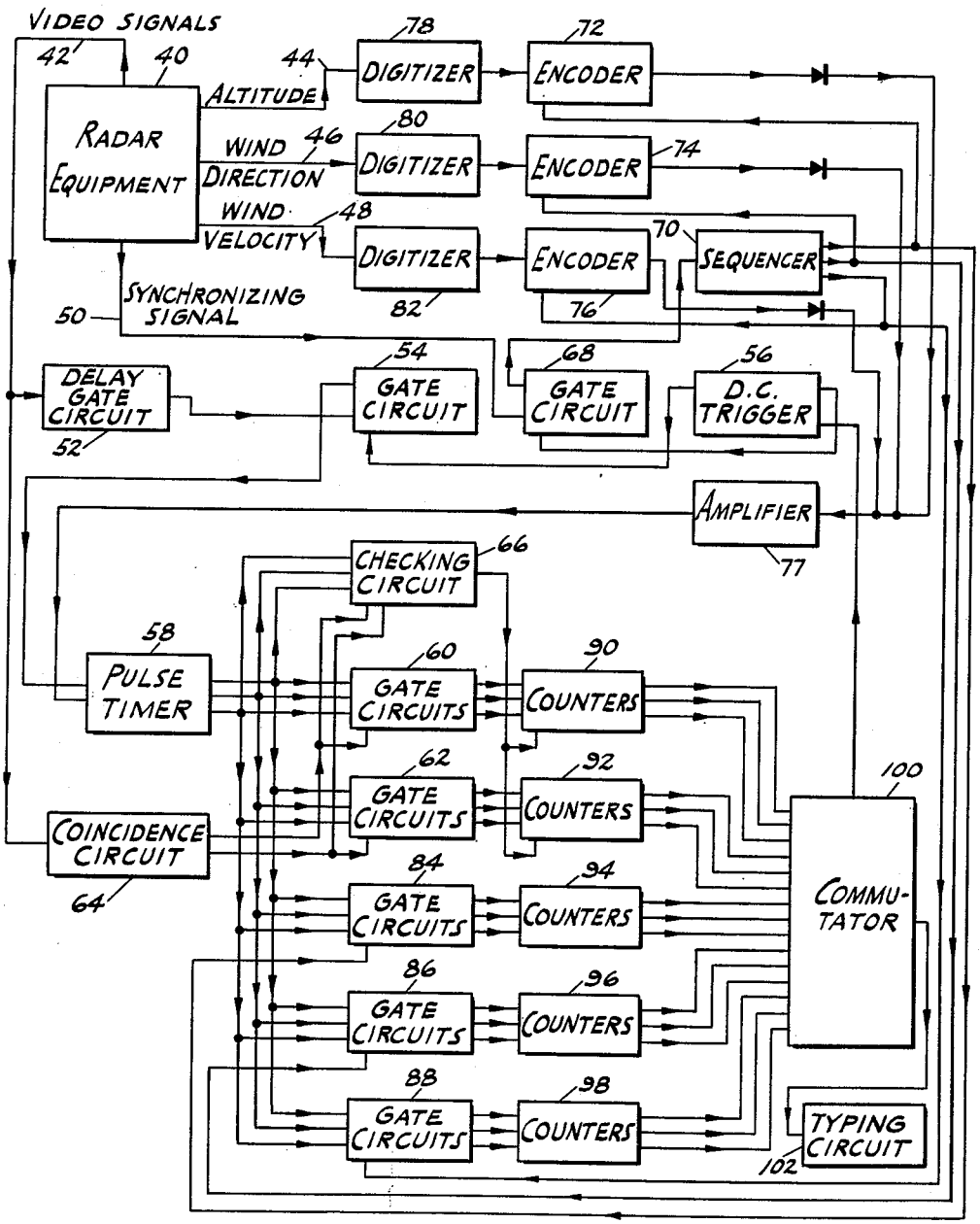
Figure 1 is a simplified block diagram of a system at a central station for decoding and recording information represented by sequences of pulses.

The system shown in Figure 5 is adapted to be used in conjunction with one embodiment of the invention and is disclosed in detail in co-pending application Serial No. 183,717 filed September 8, 1950, by Charles A. Piper. The system includes a temperature sensor 10, a digitizer 12, and an encoder 14 connected in cascade arrangement to a transmitter 16. A pressure sensor 18, a digitizer 20 and an encoder 22 are also connected in cascade arrangement to the transmitter 16. Input terminals of the encoders 14 and 22 are connected to the plates of the left tubes in monostable multivibrators 23 and 24, respectively, the plates of the left multivibrator tubes also being connected to the transmitter 16. Connections are respectively made from the grids of the left tubes in the multivibrators 23 and 24 to the plates of the left and right tubes in a multivibrator 25 having their grids connected to the output terminal of a receiver 26.

The system shown in Figure 5 is housed within the head of a rocket which is projected upwardly to an altitude of approximately 100,000 feet. At substantially its maximum altitude, the rocket head becomes detached from the rocket body and falls away from the equipment housed within it. As the equipment floats slowly by parachute towards the ground, the temperature sensor 10 and pressure sensor 18 operate to obtain measurements of the air temperature and air pressure, respectively, at the different altitudes.

The measurements obtained by the pressure sensor 10 are converted by the digitizer 12 into a plurality of voltages. Some of these voltages are directly proportional to the values of alternate digits in the measurements and others are proportional to the decimal complements of the values of the remaining digits. For example, with a temperature measurement of 369° K., three voltages of 3, 4 and 9 volts are produced by the digitizer 12. Similarly, when the temperature is 278° K., three voltages of 2, 3 and 8 volts are produced.

When a first interrogation pulse is received from the system shown in Figure 1, the left tube in the bistable multivibrator 25 becomes cut off and the right tube starts to conduct. The resultant negative pulse on the plate of the right tube in the multivibrator 25 cuts off the normally conductive left tube in the monostable multivibrator 24 for a predetermined period of time, such as 12 microseconds, and produces a positive pulse on its plate. The positive pulse from the multivibrator 24 is introduced to the transmitter 16 so that the transmitter will send out a range pulse at the beginning of the pulse from the multivibrator 24 and an identification pulse at the end of the pulse from the multivibrator 24. The period of 12 microseconds between the range and identification pulses provides a coded indication that temperature information is following the identification pulse.

The negative pulse produced by the multivibrator 24 at the end of the 12 microsecond cut-off period triggers the encoder 14 and causes the encoder to produce a sequence of three pulses spaced by periods of time proportional to the values of the different voltages from the digitizer 12. For example, with each interval of 30 microseconds representing an integer and with an initial interval of 30 microseconds representing the integer "0," the first pulse produced by the encoder 14 follows the identification pulse by a period of 120 microseconds for a temperature measurement of 369° K., and the second and third pulses follow the first and second pulses by periods of 150 and 300 microseconds, respectively. In like manner, three pulses follow the identification pulse and one another by time periods of 90, 120 and 270 microseconds when the temperature is 278° K. The range pulse in a representative sequence is illustrated at 28 in Figure 6, the identification pulse at 30 and the three information pulses at 32, 34 and 36, respectively.

The sequence of pulses relating to pressure is similar to the sequence of pulses relating to temperature, except that the range pulse 28 is separated from the identification pulse 30 by a predetermined period of time, such as 20 microseconds. This 20 microsecond period indicates that the pulses which follow relate to pressure information and distinguishes between the 12 microsecond period in the temperature sequence. The sequence of pulses relating to pressure is produced upon the reception of a second interrogation pulse and all other even interrogation pulses from the system shown in Figure 1, just as sequences of pulses relating to temperature are produced upon the reception of the first and all other odd interrogation pulses. The pressure sequence is initiated by the cutting off of the right tube in the multivibrator 25 and the conduction of the left multivibrator tube. The resultant negative pulse on the plate of the left multivibrator tube causes the multivibrator 23 to become cut off for the 20 microsecond period marking the separation between the range pulse 28 and the identification pulse 30 in the sequence. At the end of the 20 microsecond period, the multivibrator 23 triggers the encoder 22 into producing the pulses 32, 34 and 36 in the sequence. The temperature and pressure sequences are transmitted to the system shown in Figure 1 for decoding, recording and analysis.

The system shown in Figure 1 is a simplified block diagram of the equipment at the central station. It includes radar equipment, generally indicated at 40, having output lines 42, 44, 46 and 48 for directing into the proper channels information relating to air temperature and air pressure (video signals), altitude, wind direction, and wind velocity, respectively. The radar equipment also has an output line 50 for producing a synchronizing signal at a substantially constant repetition rate.

The line 42 is connected through a delay gate circuit 52 to an input terminal of a gate circuit 54 having another input terminal connected to the plate of the left tube in a D. C. trigger circuit 56. The output from the gate circuit 54 is introduced to an input terminal of a pulse timer 58, the output terminals of which are connected to corresponding input terminals of gate circuits 60 and 62. Connections are also made from corresponding input terminals of the gate circuits 60 and 62 to output terminals of a coincidence circuit 64, the input terminal of which is connected to the line 42. Corresponding input terminals of a checking circuit 66 are also connected to the output terminals of the coincidence circuit 64.

The line 50 is connected to an input terminal of a gate circuit 68 having another input terminal connected to the plate of the right tube in the D. C. trigger circuit 56. The output from the gate circuit 68 is introduced to the input terminal of an electronic sequencer 70 having a plurality of output terminals, each of which is connected to a corresponding input terminal of a different one of encoders 72, 74 and 76. Input terminals of the encoders 72, 74 and 76 are connected to the output terminals of digitizers 78, 80 and 82 having their input terminals connected to the lines 44, 46 and 48, respectively.

Connections are made from the output terminals of the encoders 72, 74 and 76 through suitable crystal diodes to an amplifier 77 and then to the input terminals of the pulse timer 58. In addition to being connected to input terminals of the gate circuits 60 and 62, the output terminals of the pulse timer 58 are connected to corresponding input terminals of gate circuits 84, 86 and 88 and to input terminals of the checking circuit 66. Other input terminals of the gate circuits 84, 86 and 88 are connected to the output terminals of the sequencer 70.

The output terminals of the gate circuits 60 and 62 are connected to the input terminals of counters 90 and 92, respectively, which also have input terminals connected to the output terminal of the checking circuit 64. Similarly, the output terminals of the gate circuits 84, 86 and 88 are respectively connected to counters 94, 96 and 98. The outputs from the counters 90, 92, 94, 96 and 98 are introduced in sequence through a commutator 100 to a typing circuit 102, a connection also being made from the commutator 100 to the grid of the right tube in the D. C. trigger circuit 56.

The radar equipment 40 receives each coded sequence of pulses from the system shown in Figure 5 and introduces the sequence through the line 42 to the coincidence circuit 64. The coincidence circuit 64 distinguishes between coded sequences of pulses relating to atmospheric temperature or pressure by determining whether a time separation of 12 or 20 microseconds exists between the range pulse 28 and the identification pulse 30. If the pulse sequence relates to temperature, a relatively high voltage is introduced from the coincidence circuit 64 to the input side of the gate circuits 60. Similarly, a relatively high voltage appears at the input side of the gate circuits 62 when the pulse sequence provides a coded indication of pressure.

The received signals appear at the delay gate circuit 52 at the same time as they appear at the coincidence circuit 64. Because of the delay in its operation, the gate circuit 52 opens after the reception of the range pulse 28 in each sequence and accordingly passes only the four information pulses 30, 32, 34 and 36 in each sequence to the gate circuit 54. The gate circuit 54 is open during the reception of the pulse sequences because of the positive voltage supplied to it from the plate of the left tube in the D. C. trigger circuit 56. This positive voltage results from the operation of the commutator 100 in producing a conduction through the right tube in the D. C. trigger circuit 56 and in cutting off the left tube in the circuit during the reception of the pulse sequences.

Since the gate circuit 54 is open, the pulses 30, 32, 34 and 36 in each sequence pass through the gate circuit to the pulse timer 58. The pulse timer converts the period of time between alternate pairs of adjacent pulses in a sequence into a plurality of signals proportional to the time period. For example, with a period of 210 microseconds between two adjacent pulses and with 30 microseconds representing an integer, seven signals are produced by the timer 28. With alternate pairs of pulses, however, the pulse timer produces a plurality of signals proportional to the decimal complements of the number represented by the time period between the pulses.

Thus, when the four pulses are spaced from one another by periods of 90, 120 and 270 microseconds, pluralities of 3, 8 and 9 signals are produced to indicate a measurement of 278° K. Similarly, when the four information pulses in a sequence are spaced by periods of 120, 150 and 300 microseconds, pluralities of 4, 7 and 10 signals are sequentially produced to indicate a measurement of 369° K. The circuitry of the pulse timer 58 is shown in detail in Figure 2A and its operation will be disclosed in detail hereafter. Because of the operation of the coincidence circuit 64, the pluralities of signals representing temperature pass through the gate circuits 60 to the counters 90, which count the number of signals in each plurality and store in separate channels the information represented by each plurality. In like manner, the pluralities of signals representing pressure pass through the gate circuits 62 to the counters 92, where each plurality is counted and stored in a separate channel.

Because of the operation of the checking circuit 66, the signals from the pulse timer 58 are able to pass through the gate circuits 60 to the counter 90 only when a correct number of pulses is received in a sequence. By way of illustration in this application, five pulses constitute the correct number of pulses in a received temperature sequence. Similarly, the pulses relating to pressure can pass through the gate circuits 62 to the counter 90 only when five pulses are received in a pressure sequence. Because of the time made available by the commutator 100 for the passage of received pulse sequences through the pulse timer 58, as many as 100 sets of sequences can be sampled by the system shown in Figure 1 to pick out a temperature sequence and a pressure sequence having the correct number of pulses.

After a predetermined period of time generally sufficient to obtain a satisfactory set of temperature and pressure information, the commutator operates to introduce a relatively low voltage to the D. C. trigger circuit 56. This voltage causes the right tube in the trigger circuit 56 to become cut off and the left tube to start conducting. The resultant voltage on the plate of the left tube becomes relatively low and prevents any temperature or pressure information from passing through the gate circuit 54 to the pulse timer 58. At the same time, the gate circuit 68 becomes open for the passage of synchronizing signals from the radar equipment 40.

The passage of the first synchronizing signal through the gate circuit 68 activates the sequencer 70, which introduces a negative voltage to the encoder 72 to trigger the encoder into operation. The encoder then converts the plurality of voltages introduced to it from the digitizer 78 into a sequence of pulses similar to the sequences representing temperature and pressure except for the omission of a range pulse 28. The sequence of pulses from the encoder 72 provides a coded indication of the altitude at which the atmospheric temperature and pressure were measured. The altitude indication which is converted into code in derived in a conventional manner by the radar equipment 40. The altitude indication is obtained by measuring the difference in time between the transmission of an interrogation pulse to the air-borne system shown in Figure 5 and the reception by the system shown in Figure 1 of the range pulse 28 transmitted by the air-borne system after it has received the interrogation pulse.

The coded sequence of pulses representing altitude is converted by the pulse timer 58 into pluralities of signals depending upon the periods of time between pairs of successive pulses in the sequence, as disclosed above. The pluralities of signals then pass through the gate circuits 84, which are open because of the positive voltage applied to them from the sequencer 70. The pluralities of signals representing the different digits in the altitude measurement are then counted and stored in separate channels in the counters 94.

In like manner, the sequencer 70 successively activates the encoders 74 and 76, upon the introduction of further synchronous signals from the line 50, to produce sequences of pulses representing wind direction and wind velocity. These sequences are produced from measurements which are derived in a conventional manner from the pulses received at the ground station and are similar to the received sequences shown in Figure 6 except for the omission of a range pulse 28. Each of the pulse sequences representing wind direction and wind velocity is converted by the pulse timer 58 into pluralities of signals proportional to the different digits in the measurements. The signals produced by the timer 58 to represent wind direction pass through the gate circuits 86 to the counters 96 for storage in their proper channels, and the signals representing wind velocity pass through the gate circuits 88 to the counters 98.

After the storage of the information represented by the received pulses and the other information derived from the received pulses, the commutator 100 operates to provide for the sequential passage of each piece of information to the typing circuit 102. Thus, the information in the different counters constituting the counters 90 initially passes in sequence to the typing circuit 102 for recordation and is followed by the information in the different counters constituting the counters 92.

The recorded values of each condition are separated by a suitable horizontal space from the recorded values of the other conditions to facilitate their study. When more than one value of a condition is recorded, the different recordations of the condition are vertically aligned to facilitate a quick comparison of any changes in value. By way of illustration, the different measurements of temperature appear in column A of Figure 4, the measurements of pressure in column B, and the measurements of the altitude at which each measurement of temperature and pressure is made in column C. Columns D and E indicate wind direction and wind velocity respectively. The measurements indicated in Figure 4 are actual values which have been recorded by equipment built in accordance with this disclosure.

Figure 2B:
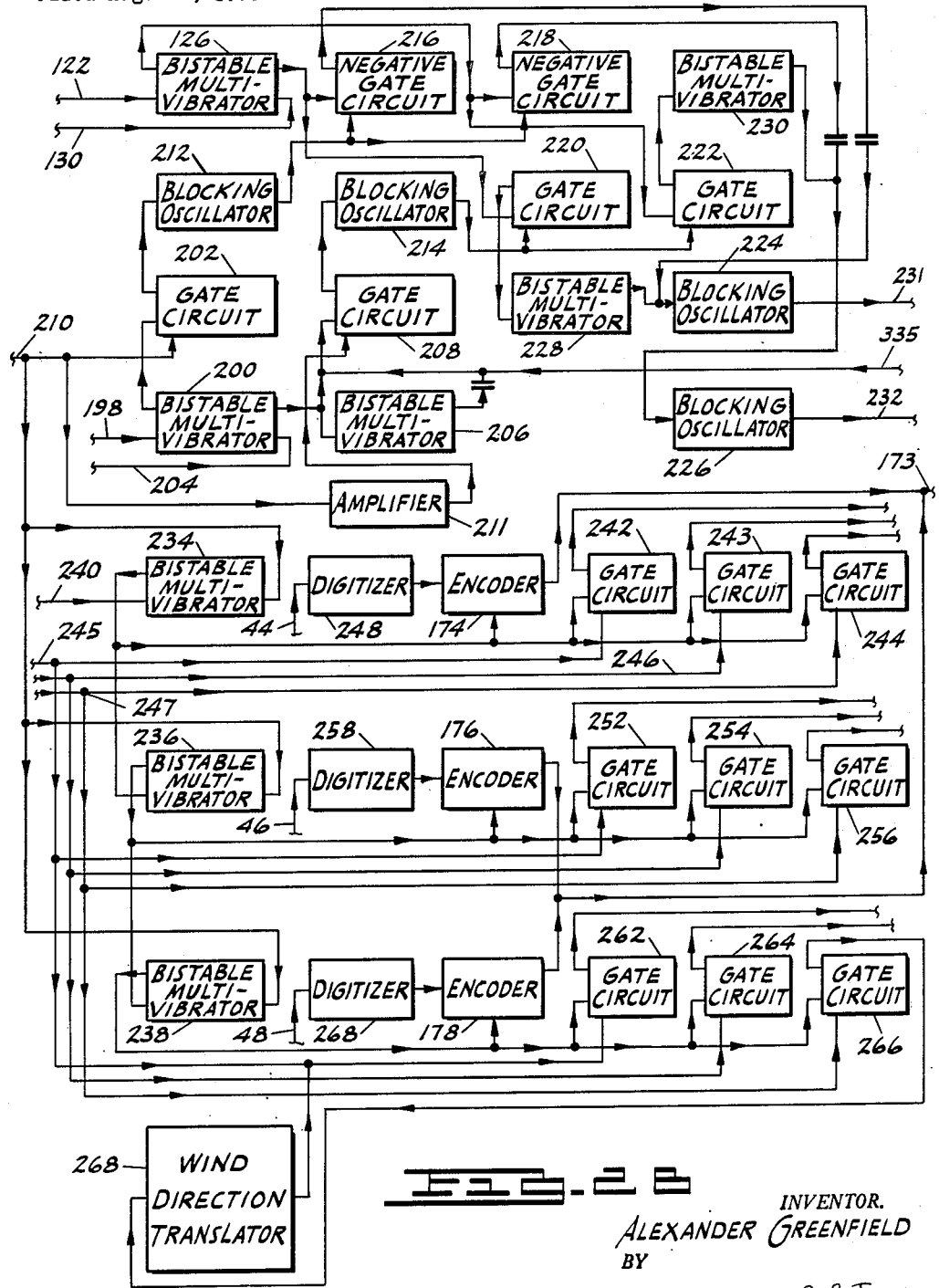
Figure 2C:
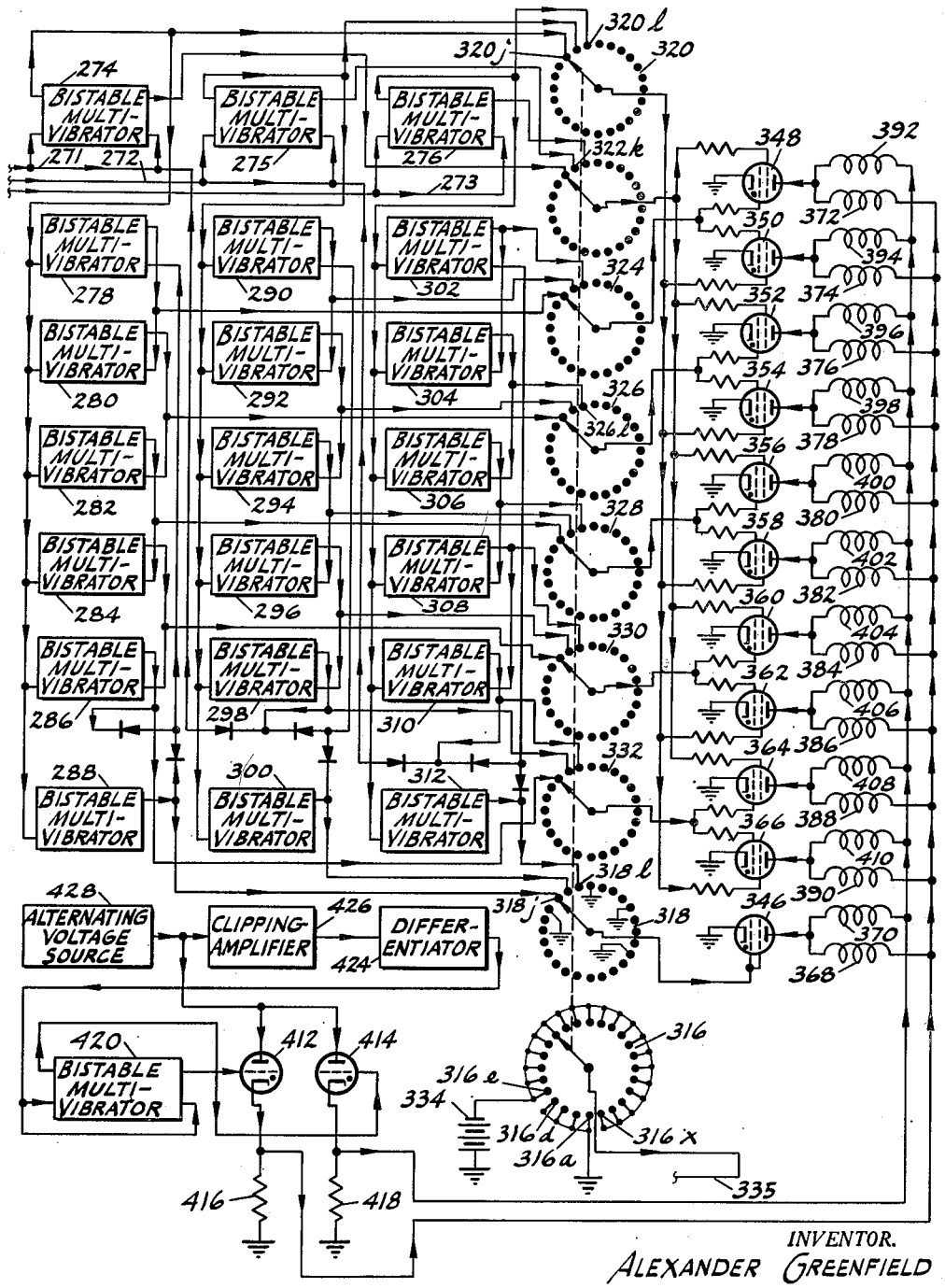

The system shown in Figures 2A, 2B and 2C is a somewhat detailed embodiment of the system shown in Figure 1. It includes the radar equipment 40 having the output lines 42, 44, 46, 48 and 50. In the system, the input terminal of blocking oscillator 110 is connected to the line 42 and the output terminal is connected to the cathodes of the triodes in gate circuits 112 and 114, to the grid of the left tube in a monostable multivibrator 116 and to the input terminal of a delay blocking oscillator 118. The plate of the left tube in the multivibrator 116 is connected to the control grid of the triode in the gate circuit 112 and to the grid of the left tube in a monostable multivibrator 120. A connection is made from the plate of the left tube in the multivibrator 120 to the control grid of the triode in the gate circuit 114.

The output signals from the gate circuit 112 are introduced through a lead 122 (Figures 2A and 2B) to the grids of the left tubes in bistable multivibrators 124 (Figure 2A) and 126 (Figure 2B) and through a crystal diode to the grid of the left tube in a monostable multivibrator 128 (Figure 2A). Similarly, the output signals from the gate circuit 114 are introduced by a lead 130 to the grid of the left tube in a bistable multivibrator 132, to the grid of the right tube in the multivibrator 126 and through a crystal diode to the grid of the left tube in the multivibrator 128. The plate of the left tube in the multivibrator 128 is connected to the control grid of the triode in a gate circuit 134, the cathode of which is connected to the output side of the blocking oscillator 118 and the plate of which is connected to the cathode of the triode in a gate circuit 136.

A connection is made from the plate of the right tube in the bistable multivibrator 124 to the grid of the left tube in a bistable multivibrator 138. The grid of the right tube in the bistable multivibrator 138 is connected to the output side of a blocking oscillator 140, the input side of which is connected to the line 50. The plate of the left tube in the multivibrator 138 is connected to the control grids of the triodes in gate circuit 142, 144 and 146. The cathodes of the triodes in the gate circuits 142, 144 and 146 are connected to the output terminal of a regenerative amplifier 148, the plate of the pentode in a gate circuit 150 and the output terminal of a regenerative amplifier 152, respectively.

In like manner, the voltage on the plate of the right tube in the bistable multivibrator 132 is applied to the grid of the left tube in a bistable multivibrator 154, the grid of the right tube in the multivibrator 154 being connected to the output side of the blocking oscillator 140. The plate of the left tube in the multivibrator 154 is connected to the control grids of the triodes in gate circuits 156, 158 and 160 having their cathodes connected in parallel with the cathodes of the triodes in the gate circuits 142, 144 and 146, respectively.

In addition to being connected to the grids of the right tubes in the multivibrators 138 and 154, the output side of the blocking oscillator 140 is connected to the cathodes of the triodes in gate circuits 162 and 164, respectively. The control grids of the triodes in the gate circuits 162 and 164 are respectively connected to the plates of the right and left tubes in the D. C. trigger circuit 56, also shown in Figure 1. The plates of the triodes in the gate circuits 162 and 164 are respectively connected to the grids of the right and left tubes in a bistable multivibrator 166.

Connections are made from the plate of the left tube in the multivibrator 166 to the input terminal of a blocking oscillator 168 and to the control grid of the triode in the gate circuit 136. The plate of the right multivibrator tube is connected to the control grid of the triode in a gate circuit 170 having its cathode connected to the output side of a blocking oscillator 172. Signals are introduced by a lead 173 (Figures 2A and 2B) to the input side of the blocking oscillator 172 from the output terminals of encoders 174, 176 and 178.

The plates of the pentodes in the gate circuits 136 (Figure 2A) and 170 are connected by a lead 179 to the grids of the left tubes in bistable multivibrators 180, 182, 184 and 186. The plates of the right tubes in the multivibrators 180, 182 and 184 are connected to the grids of the right tubes in the multivibrators 182, 184 and 186, respectively. A connection is also made from the plate of the right tube in the multivibrator 182 to an input terminal of a ringing oscillator 188, the output terminal of which is connected to the input terminal of the regenerative amplifier 148.

The output signals from the amplifier 148 are in turn fed back to the input side of the oscillator 188 to sustain constant amplitude oscillations. The multivibrator 186, a ringing oscillator 190 and the amplifier 152 are connected in a manner similar to that disclosed above for the multivibrator 182, the oscillator 188 and the amplifier 148.

The plate of the left tube in the bistable multivibrator 184 is connected to the grid of the left tube in a monostable multivibrator 192 and to the control grid of the triode in the gate circuit 150. The plate of the left tube in the multivibrator 192 is connected to the input terminal of a ringing oscillator 194, the output terminal of which is connected to a regenerative amplifier 196. The output from the amplifier 196 is introduced to the cathode of the triode in the gate circuit 150 and is fed back to the input side of the oscillator 194.

In addition to being connected to the grids of the left tubes in the multivibrators 180, 182, 184 and 186, the plates of the triodes in the gate circuits 136 and 170 are connected by a lead 198 (Figures 2A and 2B) to the grid of the left tube in a bistable multivibrator 200 (Figure 2B) having its plate connected to the control grid of the triode in a gate circuit 202. Connections are made by a lead 204 (Figures 2A and 2B) from the grid of the right tube in the multivibrator 200 to the plate of the right tube in the multivibrator 186 (Figure 2A) and from the plate of the tube to the grid of the left tube in a bistable multivibrator 206 and to the suppressor grid of the pentode in a gate circuit 208. The voltage on the plate of the right tube in the multivibrator 206 is applied through a suitable capacitance to the suppressor grid of the pentode in the gate circuit 208.

The cathode of the triode in the gate circuit 202 is connected by a lead 210 (Figures 2A and 2B) to the output terminal of the blocking oscillator 140. The blocking oscillator 140 is also connected through the lead 210 to the input termial of an amplifier 211 having its output terminal connected to the control grid of the pentode in the gate circuit 208. The plates of the tubes in the gate circuits 202 and 208 (Figure 2B) are connected to the input sides of blocking oscillators 212 and 214, respectively. Connections are made from the output side of hte blocking oscillator 212 to the cathodes of the triodes in gate circuits 216 and 218 and from the blocking oscillator 214 to the cathodes of the triodes in gate circuits 220 and 222. The control grids of the triodes in the gate circuits 216 and 220 are connected to the plate of the right tube in the multivibrator 129, and the control grids of the triodes in the gate circuits 218 and 222 are connected to the plate of the left multivibrator tube.

The plates of the triodes in the gate circuits 216 and 218 are connected through suitable capacitances to the input terminals of blocking oscillators 224 and 226, respectively. The plates of the triodes in the gate circuits 220 and 222 are respectively connected to the grids of the left tubes in bistable multivibrators 228 and 230 having the plates of their right tubes connected to the input terminals of the blocking oscillators 224 and 226.

The outputs from the blocking oscillators 224 and 226 are introduced through leads 231 and 232 to appropriate grids of tubes in the bistable multivibrators which are operative during the reception and assimilation of sequences of pulses providing information as to atmospheric pressure and temperature, respectively. For example, the outputs from the blocking oscillators 224 and 226 are respectively introduced to the grids of the right tubes in the bistable multivibrators 124 and 132. As will be disclosed in detail hereafter, the passage of a signal through the blocking oscillator 224 perpares the associated multivibrators for proper operation on subsequent sequences of received signals relating to pressure in case a predetermined number of signals has not been received in prior pressure sequences. The blocking oscillator 226 prepares its associated multivibrators in a similar manner with respect to temperature sequences.

The output from the blocking oscillator 140 (Figure 2A) is also introduced through the lead 210 (Figures 2A and 2B) to the grids of the right tubes in bistable multivibrators 234 (Figure 2B), 236 and 238. The grid of the left tube in the multivibrator 234 is connected by a lead 240 (Figures 2A and 2B) to the plate of the left tube in the multivibrator 166 (Figure 2A). The plate of the left tube in the multivibrator 234 is connected to the grid of the left tube in the multivibrator 236 and to the control grids of the triodes in gate circuits 242, 243 and 244. The cathodes of the triodes in the gate circuits 242, 243 and 244 are connected by leads 245, 246 and 247 (Figures 2A and 2B), to the output side of the amplifier 148, the plate of the triode in the gate circuit 150 and the output side of the amplifier 152, respectively. The plate of the left tube in the multivibrator 234 is also connected to an input terminal of the encoder 174. The encoder acts upon information from a digitizer 248, the input side of which is connected to the line 44 (Figures 2A and 2B).

The plate of the left tube in the multivibrator 236 is connected to the grid of the left tube in the multivibrator 238 and to the control grids of the triodes in gate circuits 252, 254 and 256. The cathodes of the triodes in the gate circuits 252, 254 and 256 are connected by the leads 245, 246 and 247 to the output terminals of the amplifier 148, the gate circuit 150 and the amplifier 152, respectively. The voltage on the plate of the left tube in the multivibrator 236 also controls the operation of the encoder 176, which receives information from a digitizer 258. The input side of the digitizer is connected to the line 46 (Figures 2A and 2B).

In like manner, the voltage on the plate of the left tube in the multivibrator 238 is applied to the control grids of the triodes in gate circuits 262, 264 and 266 having their cathodes connected to the lines 245, 246 and 247, respectively. The cathode of the triode in the gate circuit 262 is also connected to the output terminal of a wind direction translator 268 having its input terminal connected to the plate of the triode in the gate circuit 266. In addition to the above connections, the plate of the left tube in the multivibrator 238 is connected to an input terminal of the encoder 178, which is supplied with information from a digitizer 268. A connection is made from the input side of the digitizer 268 to the line 48.

The gate circuits 142, 144 and 146 (Figure 2A) perform a function equivalent to the gate circuit 60 shown in Figure 1 in that they channel pluralities of signals into counters which store the information represented by the signals until the information is ready to be typed. In like manner, the gate circuits 156, 158 and 160 (Figure 2A), the gate circuits 242, 243 and 244 (Figure 2B), the gate circuits 252, 254 and 256 and the gate circuits 262 and 264 operate in a manner similar to the gate circuits 62, 84, 86 and 88 (Figure 1), respectively, to channel pluralities of signals into counters associated with the gate circuits. To facilitate simplification of the drawings and the disclosure, only the counters associated with the gate circuits 142, 144 and 146 are shown in Figure 2C. However, it may be seen that the counters associated with the other gate circuits are substantially similar to those associated with the gate circuits 142, 144 and 146.

The plates of the triodes in the gate circuits 142, 144 and 146 (Figure 2A) are connected by leads 271, 272 and 273 to the grids of the left and right tubes in bistable multivibrators 274, 275 and 276 (Figure 2C), respectively. The plate of the left tube in the multivibrator 274 is connected to the grids of the left tubes in bistable multivibrators 278, 280, 282, 284, 286 and 288. The plates of the right tubes in the multivibrators 278, 280, 282 and 284 are connected to the grids of the right tubes in the multivibrators 280, 282, 284 and 286, respectively. The plates of the right tubes in the multivibrators 286 and 288 are connected through suitable crystal diodes to the grid of the right tube in the multivibrator 278.

Similarly, connections are made from the plate of the left tube in the multivibrator 275 to the grids of the left tubes in bistable multivibrators 290, 292, 294, 296, 298 and 300 and from the plate of the left tube in the multivibrator 276 to the grids of the left tubes in bistable multivibrators 302, 304, 306, 308, 310 and 312. The multivibrators 290 to 300, inclusive, and 302 to 312, inclusive, are connected to one another in the same manner as the multivibrators 278 to 288, inclusive. In addition, the plates of the right tubes in the multivibrators 298 and 310 are connected through crystal diodes to the grids of the left and right tubes in the multivibrators 272 and 274, respectively.

A plurality of ganged stepping switches 316 to 332, inclusive, is associated with the counters for providing in sequence an outlet path from each counter to a typing circuit, as will be disclosed in detail hereafter. Only the connections to the counter formed by the multivibrators 274 and 278 to 288, inclusive; the multivibrators 275 and 290 to 300, inclusive; and the multivibrators 276 and 302 to 312, inclusive, are shown but similar connections are made to the other counters in the system.

Each stepping switch has a plurality of stationary contacts—e. g., 24—which are annularly arranged to engage a movable contact in sequence as the movable contact is rotated about a centrally disposed pivotal position. Starting from a position in which the movable contact points vertically downwardly and rotating in a counter-clockwise direction, each stationary contact in a stepping switch may be designated by a successive letter of the alphabet. By such a designation, contacts 316a to 316d, inclusive, of the switch 316 are grounded and contacts 316e to 316x, inclusive, are connected to the negative terminal of a suitable power supply, such as a battery 334 adapted to supply approximately 150 volts, the positive terminal of the battery 334 being grounded. The movable contact of the switch 316 is connected by a lead 335 (Figures 2B and 2C) to the grid of the right tube in the D. C. trigger circuit 56 (Figure 2A) and to the supressor grid of the pentode in the gate circuit 208 (Figure 2B).

No connections are made to the first five contacts of each of the switches 318 to 332, inclusive. The stationary contacts 318i, 318m, 318q and 318u of the switch 318 are grounded. The other contacts of the switch 318 are connected to a corresponding terminal in each counter in the system. By way of illustration, the contacts 318j, 318k and 318l of the switch 318 are respectively connected to the plates of the right tubes in the multivibrators 288, 300 and 312.

Connections are made from the contacts 320j, 320k and 320l to the plates of the left tubes in the multivibrators 274, 275 and 276, respectively, and from the contacts 322k, 322j and 322l to the plates of the right tubes in the multibivrators 274, 275 and 276, respectively. The movable contact of the switch 320 is connected through suitable resistances to the shield grids of gas-filled tubes 350, 354, 358, 362 and 366, and the movable contact of the switch 322 is connected through suitable resistances to the shield grids of gas-filled tubes 348, 352, 356, 360 and 364.

The contacts 324j, 324k and 324l are connected to the plates of the right tubes in the multivibrators 278, 290 and 302, respectively; the contacts 326j, 326k and 326l to the plates of the right tubes in the multivibrators 280, 292 and 304, respectively; and the contacts 328j, 328k and 328l to the plates of the right tubes in the multivibrators 282, 294 and 306, respectively. In like manner, connections are made from the contacts 330k, 330j and 330l to the plates of the right tubes in the multivibrators 284, 296 and 308, respectively; and from the contacts 332k, 332j and 332l to the plates of the right tubes in the multivibrators 286, 298 and 310, respectively. The movable contacts of the switches 324, 326, 328, 330 and 332 are connected through suitable resistances to the control grids of the tubes 348 and 350, the tubes 352 and 354, the tubes 356 and 358, the tubes 360 and 362 and the tubes 362 and 364, respectively.

The cathodes of the tubes 346 and 348 to 366, inclusive, are grounded and the plates are connected to pairs of solenoids. For example, the tube 346 is connected to one side of a pair of solenoids 368 and 370. In like manner, the tubes 348 to 366, inclusive, are respectively connected to one side of solenoids 372 to 390, inclusive, and solenoids 392 to 410, inclusive. The other side of solenoids 368 and 372 to 390, inclusive, are connected to the cathode of a gas-filled tube 412 and the other solenoids are connected to the cathode of a gas-filled tube 414. Each of the solenoids 372 and 392 has an armature which is associated with a typewriter key adapted to provide a printed record of the integer "0." Similarly, an armature-actuated typewriter key having the integer "1" embossed on its face is associated with each of the solenoids 374 and 394. In this way, a pair of typewriter keys is associated with a pair of solenoids to provide a printed record of each integer from "0" to "9."

The cathodes of the tubes 412 and 414 are respectively grounded through equal resistances 416 and 418, and the grids are respectively connected to the plates of the right and left tubes in a bistable multivibrator 420. The grids of the two multivibrator tubes are connected to the output side of a differentiator 424.

The input of the differentiator is in turn connected in cascade arrangement to a clipping amplifier 426 and a source 428 of alternating voltage. Connections are made from the output side of the voltage source 428 to the plates of the tubes 412 and 414.

As previously disclosed, the radar equipment 40 (Figure 2A) transmits interrogatory pulses at predetermined intervals to the air-borne system shown in Figure 5. Upon the reception of each odd interrogatory pulse, the air-borne system transmits a sequence of pulses relating to temperature and, upon the reception of each even interrogatory pulse, the system transmits a sequence of pulses relating to pressure. These pulse sequences are received by the radar equipment 40 and introduced to the blocking oscillator 110, which inverts and amplifies the pulses. The first pulse in each sequence then passes to the multivibrator 116 and cuts off the normally conductive left tube in the multivibrator for a predetermined period of time, such as 15 microseconds. A positive voltage illustrated at 450 in Figure 3, is produced on the plate of the left tube in the multivibrator 116 during this 15 microsecond period.

The positive pulse 450 opens the gate circuit 112 for the passage of the received pulses through the blocking oscillator 110. Because of a slight delay provided in the multivibrator 116, the gate circuit 112 does not open until after the reception of the range pulse 28 in each sequence and remains open only long enough for the identification pulse 30 in each temperature sequence to pass through it. Only the identification pulse 30 in each temperature sequence passes through the gate circuit 112 since it occurs 12 microseconds after the range pulse 28 and thus coincides in time with the positive puse from the multivibrator 116. At the end of the 15 microsecond period, the left tube in the multivibrator 116 starts to conduct and produces a negative pulse on its plate. This pulse cuts off the left tube in the multivibrator 120 for a predetermined period of time, such as 10 microseconds, and produces a positive pulse, illustrated at 452, on its plate. The pulse 452 opens the gate circuit 114 for the passage of the second pulse 30 in each pressure sequence, since it occurs during the period between 15 and 25 microseconds after the range pulse 28 and coincides with the 20 microsecond period between the range pulse 28 and the identification pulse 30.

After passing through the gate circuit 112, the pulse 30 in each temperature sequence cuts off the normally conductive left tube in the multivibrator 124. The resultant negative pulse on the plate of the right tube in the multivibrator 124 cuts off the left tube in the multivibrator 138 and produces a positive pulse on its plate. This positive pulse from the multivibrator 138 opens the gate circuits 142, 144 and 146 for the passage of signals, as will be disclosed in detail hereafter. In like manner, the pulse 30 in each pressure sequence acts upon the multivibrator 132, which in turn acts upon the multivibrator 154 to open the gate circuits 156, 158 and 160 for the passage of signals.

In addition to acting upon either the multivibrator 124 or the multivibrator 132, the pulse 30 in each sequence cuts off the left tube in the monostable multivibrator 128 for a period of time greater than the time required for the reception of all the pulses in a sequence. The positive pulse from the multivibrator 128 in turn causes the gate circuit 134 to open for the passage of signals from the blocking oscillator 118. A slight delay is provided in the passage of signals through the blocking oscillator 118 to compensate for the lags inherent in the operation of the multivibrators 116, 120 and 128 and the gate circuits 112 and 114. Because of this lag, the last four pulses 30, 32, 34 and 36 in each received sequence are able to pass through the gate circuit 134.

The signals from the gate circuit 134 pass to the gate circuit 136, which is open during the time that the movable contact of the stepping switch 316 (Figure 2C) is rotating through the arc occupied by contacts 316a to 316d, inclusive. The gate circuit 136 is open during this time because of the ground potential applied through the movable contact of the switch 316 and the lead 335 (Figures 2A and 2C) to the grid of the right tube in the D. C. trigger circuit 56 (Figure 2A). The ground potential causes the right tube in the trigger circuit to start conducting and the left tube to become cut off, such that a positive voltage is produced on the plate of the left tube. This voltage opens the gate circuit 164 for the passage of a synchronizing signal from the blocking oscillator 140 to the left tube in the multivibrator 166. The resultant cut-off of the left tube in the multivibrator 166 produces a positive pulse which opens the gate circuit 136 for the passage from the gate circuit 134 of the received pulses 30, 32, 34 and 36 in each received sequence.

When the gate circuit 136 opens, the received pulses pass through the gate circuit to the pulse timer represented by the multivibrators 180, 182, 184 and 186 and their associated circuits. The pulse timer is indicated at 58 in Figure 1 and is disclosed in detail in co-pending application Serial No. 212,420 filed February 23, 1951, by Alexander Greenfield, now Patent No. 2,647,996. The pulse 30 in each received sequence passes through the lead 179 and cuts off the normally conductive left tube in the multivibrator 180, producing a negative pulse on the plate of the right tube. Because of this negative pulse, the normally conductive right tube in the multivibrator 182 is cut off and a positive pulse is produced on its plate, as illustrated at 456 in Figure 5. The pulse 456 continues until the introduction of the received pulse 32, which cuts off the left tube in the multivibrator 182 and causes the right tube to conduct. During the pulse 456, signals illustrated at 458 are produced by the oscillator 188 at intervals corresponding to the intervals representing an integer in the time periods between each pair of transmitted signals. Thus, if 30 microseconds represents an integer and if the pulse 32 follows the pulse 30 by a period of 150 microseconds, five signals are produced by the oscillator 188. The signals 458 are amplified and inverted by the amplifier 148, which also helps to maintain the oscillator 188 in operation during the pulse 456.

When the left tube in the multivibrator 182 becomes cut off upon the introduction of the pulse 32 in each received sequence, the right tube starts to conduct and causes the normally conductive right tube in the multivibrator 184 to become cut off as illustrated at 460. A negative pulse then appears on the plate of the left tube in the multivibrator 184 and causes the left tube in the multivibrator 192 to become cut off. A positive pulse, illustrated at 462, is thus produced on the plate of the left tube in the multivibrator 192 for a predetermined time, such as 360 microseconds. During the pulse 462, the oscillator 194 produces signals 464 at the same frequency as the oscillator 188, 12 signals being produced at 30 microsecond intervals if the pulse 462 is 30 microseconds long. The signals 464 pass in inverted form through the amplifier 196 to the cathode of the triode in the gate circuit 150.

Since some of the signals 464 are introduced to the cathode of the triode in the gate circuit 150 during the introduction to the control grid of a negative pulse from the left tube in the multivibrator 184, these signals are quenched. The number of signals quenched by the gate circuit 150 is directly proportional to the period of time of the negative pulse from the left tube in the multivibrator 184, this period being equal to the period of time between the pulses 32 and 34 in each received sequence. The quenched signals are in effect subtracted from the twelve signals produced by the oscillator 194 so that the number of signals actually passing through the gate circuit 150 represents the decimal complement of the value indicated by the number of suppressed signals. The signals passing through the gate circuit 150 are indicated at 466 in Figure 3.

For example, with a 150 microsecond period between the pulses 32 and 34, five of the twelve signals produced by the oscillator 194 are prevented from passing through the gate circuit 150. The seven signals which do pass through the gate circuit indicate the integer "6," which is the decimal complement of the value "4" represented in coded form by the period of 150 microseconds. Similarly, eight signals pass through the gate circuit 150 to indicate the integer "7" when the pulses 32 and 34 are separated by 120 microseconds.

When the pulse 34 in each sequence is introduced to the multivibrator 184, it cuts off the left tube in the multivibrator and causes the right tube to conduct. The resultant negative pulse on the plate of the right tube in the multivibrator 184 cuts off the normally conductive right tube in the multivibrator 186 and produces a positive pulse 468 on its plate. The positive pulse 468 continues until the introduction of the pulse 36. During the pulse 468, the oscillator 190 produces signals at the same frequency as, and in a manner similar to, the oscillator 188. The number of signals produced by the oscillator 190 provides a direct indication of the value of the third digit in each measurement. These signals are indicated at 470 in Figure 3.

Sometimes the plurality of pulses received in a particular sequence by the radar equipment 40 is different from the five pulses constituting the required number in this disclosure. Less than five pulses may be received in a sequence if the pulses are relatively weak, or additional pulses may be injected into the sequence if interference is encountered from extraneous objects or signals are transmitted from undesirable sources. Whether too few or too many pulses are received, the time period between successive pulses is altered so that the pluralities of signals produced by the pulse timer disclosed immediately above do not represent actual values. A circuit for checking the number of pulses received in each sequence and for eliminating the information represented by an incorrect number of pulses is included in the system shown in Figures 2A, 2B and 2C. This circuit is a somewhat detailed embodiment of the checking circuit 66 shown in Figure 1 and is disclosed in full detail in co-pending application Serial No. 217,939 filed March 28, 1951, by Alexander Greenfield.

If the correct number of pulses is received in a sequence, the last pulse in the sequence cuts off the left tube in the multivibrator 186 (Figure 2A) and causes the right tube to conduct. When the right multivibrator tube starts to conduct, it introduces a negative pulse through the lead 204 (Figures 2A and 2B) to the grid of the normally conductive right tube in the multivibrator 200 (Figure 2B), which then becomes a cut off and produces a positive pulse on its plate.

When only five pulses are received in a sequence, the positive pulse produced on the plate of the right tube in the multivibrator 200 coincides with the positive pulse on the plate of the right tube in the multivibrator 206. If less than five pulses are received, a positive pulse does not appear on the plate of the right tube in the multivibrator 200, and, upon the reception of more than five pulses, the right tube in the multivibrator 206 starts to conduct and produces a negative pulse on its plate.

The pulses from the right tubes in the multivibrators 200 and 206 are both introduced to the suppressor grid of the pentode in the gate circuit 208. In this way, the gate circuit opens only when both pulses are simultaneously positive to indicate that exactly five pulses have been received in a sequence. The voltage on the movable contact of the stepping switch 316 (Figure 2C) is also introduced through the lead 335 (Figures 2B and 2C) to the suppressor grid of the pentode in the gate circuit 208 to make certain that the gate circuit 208 opens only during the time that signals are actually being received and assimilated. As previously disclosed, the system shown in Figures 2A, 2B and 2C assimilates the received signals only when the movable contact of the switch 316 engages the stationary contacts 316a to 316d, inclusive, causing a ground potential rather than a negative potential to appear on the movable contact of the switch.

When the gate circuit 208 opens a synchronizing signal from the blocking oscillator 140 (Figure 2A) passes through the lead 210 (Figures 2A and 2B) to the amplifier 211 (Figure 2B) and then through the amplifier 211 and the gate circuit 208 to the gate circuits 220 and 222. The gate circuit 222 is open during the reception of a sequence of pulses relating to temperature and the gate circuit 220 is open during the reception of a sequence of pulses relating to pressure. The gate circuit 222 becomes open upon the reception of the range pulse 28 in the temperature sequence, which passes through the gate circuit 112 (Figure 2A) and lead 122 (Figures 2A and 2B), as previously disclosed. This pulse cuts off the left tube in the multivibrator 126 and produces a positive pulse on its plate. The positive pulse from the multivibrator opens the gate circuit 222 so that the pulse from the blocking oscillator 214 may pass through the gate circuit to the normally conductive left tube of the multivibrator 230.

The pulse passing through the gate circuit 222 cuts off the left tube in the multivibrator 230 and causes the right tube to start conducting. Conduction of the right tube in the multivibrator 230 prevents the blocking oscillator 226 from conducting, since the oscillator is designed to conduct only when positive pulses are simultaneously introduced to it from the multivibrator 230 and the negative gate circuit 218. By preventing any signals from passing through the blocking oscillator 226, the temperature information derived from the received sequence is retained for subsequent recordation and analysis, as will be disclosed in detail hereafter.

Upon the formation of the next synchronizing signal from the blocking oscillator 140 after the assimilation of a sequence of pulses relating to temperature, the right tube in the multivibrator 138 becomes cut off and the left multivibrator tube conducts. This causes a negative pulse to be introduced to the gate circuits 142, 144 and 146 to close the gate circuits. If the assimilated sequence of pulses had the correct number of pulses, the gate circuits 142, 144 and 146 remain closed and prevent the passage of information from subsequent sequences of pulses relating to temperature. This results from the fact that the left tube in the multivibrator 124 has been cut off by the identification pulse 30 in the assimilated sequence and cannot be returned to its original state of conduction unless a signal is introduced to it from the blocking oscillator 226. As disclosed above, the blocking oscillator 226 cannot conduct if a correct number of pulses is received in a sequence relating to temperature.

In like manner, the first pulse 28 in each pressure sequence passes through the gate circuit 114 and cuts off the right tube in the multivibrator 126. The positive pulse from the multivibrator 126 opens the gate circuit 220 for the passage of a pulse from the gate circuit 208 through the blocking oscillator 214 in case only five pulses are received in the pressure sequence. The pulse from the gate circuit then passes through the gate circuit 220 and cuts off the left tube in the multivibrator 228. When the left tube in the multivibrator 228 becomes cut off, the right tube conducts and prevents the blocking oscillator 224 from cancelling the pressure information and returning to their initial conditions the stages which operate on the pressure information. By preventing a "zeroizing" signal from passing through the blocking oscillator 224, the left tube in the multivibrator 132 remains cut off and the right tube in the multivibrator 154 becomes cut off after the introduction of the next synchronizing signal from the blocking oscillator 140. This prevents any further information relating to pressure from passing through the gate circuits 156, 158 and 160 until after a typewritten record has been made of the assimilated sequence.

In case less than five pulses are received in a sequence, the right tube in the multivibrator 200 continues to conduct. This causes a negative pulse to be introduced from the plate of the right multivibrator tube to the gate circuit 208 to prevent any signals from passing through the gate circuit. However, the positive voltage appearing on the plate of the left tube in the multivibrator 200 because of the cut-off condition of the tube opens the gate circuit 202 for the passage of a synchronizing signal through the lead 210 (Figures 2A and 2B) from the blocking oscillator 140 (Figure 2A). This synchronizing signal passes through the blocking oscillator 212 to the cathodes of the triodes in the negative gate circuits 216 and 218.

Each of the gate circuits 216 and 218 normally conducts unless a negative voltage appears on the control grid of its triode at the same time that a positive signal appears on the cathode of its triode. Upon the introduction of a synchronizing signal from the blocking oscillator 212, either the gate circuit 216 or the gate circuit 218 closes. The gate circuit 216 closes during the reception of pulses relating to pressure, since the range pulse 28 in the pressure sequence cuts off the left tube in the multivibrator 126 and causes the right tube to conduct, thereby producing a negative pulse on the control grid of the triode in the gate circuit 216. When the gate circuit closes, a positive signal resembling in inverted form the shape of the synchronizing signal appears on the plate of its triode. Similarly, the gate circuit 218 closes if less than five signals are received in a temperature sequence, and a positive voltage appears on its plate.

The positive signal produced on the plate of the triode in the gate circuit 216 is introduced to the blocking oscillator 224, which is open for the passage of signals because of the positive voltage applied to it from the plate of the right tube in the multivibrator 230. The positive signal passes through the oscillator 224 to the counters connected to the gate circuits 142, 144 and 146 (Figure 2A) and cancels the information stored in the counters.

The signal passing through the oscillator 224 also "zeroizes" all of the multivibrators in the counters by returning them to their original state of conduction. In this way, the multivibrators in the counters are able to count properly the pluralities of signals which are produced to indicate the next coded sequence of pulses relating to pressure. In addition, such stages as the multivibrators 124 and 138 are "zeroized" so that the next sequence of pulses relating to pressure may pass through the gate circuits 142, 144 and 146 to the associated counters. In like manner, a positive signal from the gate circuit 218 passes through the blocking oscillator 226 and eliminates the information stored in the counters associated with the gate circuits 156, 158 and 160. The operation of the counters will be disclosed in detail hereafter.

Upon the reception of more than five pulses in a sequence, the sixth pulse cuts off the left tube in the multivibrator 200 and causes the right tube to conduct. The right tube in the multivibrator 200 continues to conduct even if more than six pulses are received in the sequence. Conduction of the right tube in the multivibrator 200 causes the normally conductive left tube in the multivibrator 206 to become cut off and the right tube to start conducting. The negative pulses which are thus produced on the plates of the right tubes in the multivibrators 200 and 206 operate to prevent any signal from passing through the gate circuit 208. However, the gate circuit 202 is opened for the passage of signals from the blocking oscillator 140 because of the return of the left tube in the multivibrator 200 to a state of non-conduction. The synchronizing signal travels through the blocking oscillator 212 to the gate circuits 216 and 218. If the pulse sequence requiring elimination relates to pressure, a "zeroizing" signal appears on the output side of the gate circuit 216 and passes through the blocking oscillator 224 to the counters storing the pressure information. In like manner, a "zeroizing" signal passes through the blocking oscillator 226 and eliminates the information stored in the counters relating to temperature when more than five signals are received in a temperature sequence.

When the movable contact of the switch 316 (Figure 2C) rotates to contact 316e, a negative voltage of 150 volts is introduced from the movable contact of the switch through the lead 335 (Figures 2A and 2C) to the grid of the right tube in the D. C. trigger circuit 56 (Figure 2A). This negative voltage causes the right tube in the trigger circuit to become cut off and a positive pulse to be introduced to the gate circuit 162, which then becomes open for the passage of a synchronizing signal from the blocking oscillator 140. The synchronizing signal passing through the gate circuit 162 cuts off the right tube in the multivibrator 166 and causes a positive pulse to be introduced from the plate of the tube to the gate circuit 170, which opens for the passage of derived pulse sequences. At the same time, the negative pulse on the plate of the left tube in the multivibrator 166 closes the gate circuit 130 against the further passage of any received sequences of pulses.

Upon the formation of a negative pulse on the plate of the left tube in the multivibrator 166, and the passage of this pulse through the lead 240 (Figures 2A and 2B), the normally conductive left tube in the multivibrator 234 becomes cut off and a positive pulse is produced on its plate. This pulse activates the encoder 174 (Figure 2B), which converts the voltages provided by the digitizer 248 into a sequence of pulses similar to the received sequences, except for the omission of any range pulse 28. The digitized voltages represent the values of successive digits providing an indication of substantially the altitude at which the measurements of atmospheric temperature and pressure have been obtained. As previously disclosed, the altitude measurement is derived in a conventional manner from the received sequence of pulses and is introduced to the digitizer 248 through the line 44.

The sequence of pulses from the encoder 174 (Figure 2B) passes through the lead 173 (Figures 2A and 2B), the blocking oscillator 172 (Figure 2A) and the gate circuit 170 to the pulse timer which includes the multivibrators 180, 182, 184 and 186 as disclosed above. The pulse timer converts the period of time between each pair of successive pulses in the sequence into a plurality of signals proportional to the value of the digit represented by the time period. The signals are also channeled by the timer so that a different plurality passes through the amplifier 148, the gate circuit 150 and the amplifier 152 to the gate circuits 242, 243 and 244, respectively. The gate circuits are open for the passage of the pluralities of signals because of the positive pulse applied from the multivibrator 234 to the control grids of their triodes at the same time that the encoder 174 is activated. The signals then pass into counters associated with the gate circuits for storage until the proper time for recordation of the information represented by the signals.

The passage of the altitude information into the appropriate counters is initiated upon the introduction of the first synchronizing signal from the blocking oscillator 140 to the gate circuit 162 (Figure 2A) after the movable contact of the stepping switch 316 has reached the stationary contact 316e. The passage of the altitude information is completed before the passage of the next synchronizing signal through the blocking oscillator 140. Upon the introduction of the next synchronizing signal through the lead 210 (Figures 2A and 2B), the right tube in the multivibrator 234 becomes cut off and the left tube starts to conduct. The resultant negative pulse on the plate of the left tube in the multivibrator 234 cuts off the normally conductive left tube in the multivibrator 236. This causes the encoder 176 to become activated for the formation of a pulse sequence representing in coded from the wind velocity at the measured altitude. The time periods between the pairs of adjacent pulses in the sequence are converted into pluralities of signals which are channeled through the gate circuits 252, 254 and 256 into associated counters. After the information relating to wind velocity is channeled into the associated counters, the left tube in the multivibrator 238 is cut off upon the introduction of the next synchronizing pulse. The encoder 178 then becomes activated and the gate circuits 262, 264 and 266 are activated for the passage of information relating to wind direction.

The pluralities of signals relating to temperature pass through the gate circuits 142, 144 and 146 and the leads 271, 272 and 273 (Figures 2A and 2C), to the multivibrators 274, 275 and 276 (Figure 2C), respectively. The first signal in the first plurality cuts off the normally conductive right tube in the multivibrator 274 and causes the left tube to conduct. When the left tube in the multivibrator 274 starts to conduct, it cuts off the normally conductive left tube in the multivibrator 288 and produces a conduction through the right tube. The resultant negative pulse on the plate of the right multivibrator tube cuts off the normally conductive right tube in the multivibrator 278 and causes the left tube in the multivibrator 278 to conduct.

The second signal in the plurality causes the left tube in the multivibrator 274 to become cut off and the third signal causes the tube to start conducting. The negative pulse produced on the plate of the left tube in the multivibrator 274 when the third signal is introduced causes the left tube in the multivibrator 278 to become cut off and the right multivibrator tube to start conducting. Conduction of the right tube in the multivibrator 278 produces a cut-off of the normally conductive right tube in the multivibrator 280 and a conduction in the left tube.

The left tube in the multivibrator 280 continues to conduct until a fifth pulse is introduced to the multivibrator 274. This signal produces a conduction once more through the left tube in the multivibrator 274 and causes a negative pulse to be introduced to the grid of the left tube in the multivibrator 280 so as to cut off the tube. Similarly, the left tubes in the multivibrators 282, 284 and 286 conduct during the sixth and seventh, eighth and ninth, and tenth and eleventh signals, respectively, in the first plurality relating to pressure. If eleven signals are introduced to the counter, the right tube in the multivibrator 286 starts to conduct and introduces a negative pulse to the grid of the right tube in the multivibrator 278 to cut off the tube. Cutting off the right tube in the multivibrator 278 prepares the counter for the initiation of a new decimal count.

Since the right tubes in the multivibrators 278, 280, 282, 284 and 286 each become cut off for a different pair of integers and since the multivibrator 274 indicates whether the integer is odd or even, each integer can be distinguished by a different combination of two multivibrators. For example, when five signals appear in a plurality to indicate the integer "4," positive pulses appear on the plate of the right tubes in the multivibrators 274 and 282. Similarly, when eight signals are introduced to the multivibrator 274 in indication of the integer "7," positive pulses are produced on the plate of the left tube in the multivibrator 274 and on the plate of the right tube in the multivibrator 284.

In case no signals are introduced to the multivibrator 274, the right tube in the multivibrator 288 remains cut off and a positive pulse continues to appear on its plate. Since even the integer "0" is indicated by the introduction of a single signal to the multivibrator 274, the failure to introduce any signals to the multivibrator represents a complete lack of information concerning the digital value. As will be disclosed in detail hereinafter, the appearance of a positive pulse on the plate of the right tube in the multivibrator 288 operates to maintain a blank in the space reserved for the digital value.

The counter formed by the multivibrator 275 and 290 to 300, inclusive, operates in a manner similar to that disclosed above. However, upon the introduction of eleven signals to the counter, the negative pulse from the multivibrator 298 not only cuts off the right tube in the multivibrator 290 but also introduces a negative pulse to the multivibrator 274. This, in effect, constitutes a carry-over of an integer from one column to the next highest column upon a full decimal count of "10" in the first column. Similarly, a signal is added to the multivibrator 275 upon the introduction of eleven signals to the counter formed by the multivibrators 276 and 302 to 312, inclusive.

The counters relating to atmospheric pressure, altitude and wind velocity operate in a similar manner to the counter disclosed above. However, the counters relating to wind direction operate in a slightly different manner since they indicate an angular quantity. In the counters relating to wind direction, two pluralities of signals relating to the "units" digits and "tens" digits are introduced to the counters. The "hundreds" counter does not receive a plurality of signals but only those signals which are carried over from the "tens" counter upon each decimal count of "10" in the "tens" counter. Furthermore, since an angular quantity counts only between 0° and 360° before a new count starts, only enough multivibrators are provided in the "hundreds" counter to count up to the integer "4."

The information provided by the counters relating to wind direction indicates the direction of the wind relative to a fixed reference such as due north. The direction of the wind relative to a fixed reference is converted by the wind direction translator 268 from information disclosing the quadrant in which the wind is blowing and the partcular direction of the wind in the quadrant. For example, an indication that the wind is blowing towards the fourth, or northwest, quadrant at an angle of 27° from due west is converted by the wind direction translator 268 and the circuits associated with it into an indication that the wind is blowing at an angle of 297° relative to due north. The operation of the wind direction translator 268 is disclosed in detail in co-pending application Serial No. 224,414 filed by Reno V. Benaglio and Raymond J. Nymberg, on May 3, 1951, now Patent No. 2,625,600.

By the time that the movable contacts of the stepping switches 316 to 332, inclusive, have rotated through a sufficient arc to engage contacts 316e to 332e, respectively, all of the information relating to atmospheric temperature and pressure and to altitude, wind velocity and wind direction has been assimilated and stored in the appropriate counters. As the movable contacts of the stepping switches 320 to 322, inclusive, rotate beyond the stationary contacts 320f to 332f, inclusive, the information in each counter is introduced in sequence to the typing circuit for recordation.

For example, as the movable contacts engage the stationary contacts 320j to 332j, 320k to 332k and 320l to 332l, the information relating to each digit in the temperature measurement is released in sequence to the typing circuit. With a temperature measurement of 369° K., positive pulses are introduced through the contact 320j to the shield grids of the tube 350, 354, 358, 362 and 366 and through the contact 326j to the control grids of the tubes 352 and 354. Only the tube 354 conducts since it is the only tube which has positive pulses applied to both its control and shield grids. Conduction of the tube 354 causes one of the solenoids 378 or 398 to be energized and the integer "3" to be typed, as will be disclosed in detail hereafter. Similarly, for the integer "6," the right tubes of the multivibrators 275 and 296 produce positive pulses which travel through the contacts 322k and 330k and energize the tube 360. Pulses pass from the left tube in the multivibrator 276 and the right tube in the multivibrator 318 through the contacts 320l and 332l and energize the tube 366 to indicate the integer "9" in the temperature measurement of 369° K. When the tube 366 is energized, either the solenoid 390 or the solenoid 410 is actuated to record the integer "9."

The state of conduction of the bistable multivibrator 420 determines whether current flows through one or the other of the solenoids associated with the gas-filled tube which is energized. Thus, when the left tube in the multivibrator 420 is cut off, current flows through the solenoid 398 and the tube 354 to indicate the integer "3." The current flows through the solenoid 398 rather than the solenoid 378 since the positive pulse from the multivibrator 420 causes the tube 414 to conduct and a voltage to be produced across the resistance 418. The voltage across the resistance 418 serves as a power supply for the flow of current through the solenoid 398 and the tube 354. In like manner, current flows through the solenoid 384 and the tube 360 when the right tube in the multivibrator 420 is cut off and the integer to be indicated is "6."

The two tubes in the multivibrator 420 are alternately cut off by signals which occur at a frequency synchronized to the rate at which the movable contacts of the switches 314 to 322, inclusive, engage successive stationary contacts on the switches. By alternately cutting off each tube in the multivibrator 420 so that first the solenoids 372 to 390, inclusive, and then the solenoids 392 to 410, inclusive, are prepared for the actuation of the appropriate solenoid in the set, the rate at which integers may be recorded is increased. For example, with a temperature measurement of 366° K., the key recording the integer "3" in the set of keys associated with the solenoids 372 to 390, inclusive, may be actuated while the key recording "3" in the set associated with the solenoids 392 to 410, inclusive, may be returning to its resting position after having been actuated. In this way, it is not necessary to wait for a key to return to its resting position before the integer represented by the key is recorded again. The typing circuit illustrated in Figure 2C for providing recorded information at an increased speed is disclosed in full detail in co-pending application Serial No. 212,294 filed February 23, 1951, by Alexander Greenfield, Charles J. Stuart and Charles A. Piper.

The typewritten records relating to the different conditions are separated from one another, as illustrated in Figure 4, in order to provide an instantaneous differentiation between the values relating to the different conditions. The space between two conditions which are recorded contiguous to each other is provided by a grounded stationary contact on the switch 318. For example, the space between the typewritten records relating to atmospheric temperature and pressure is provided when the movable contact of the switch 318 engages the grounded stationary contact 318m. This causes the control grid of the gas-filled tube 346 to become grounded. Since the cathode of the tube is also grounded, the tube conducts and current flows through the solenoid 368 or the solenoid 378, both of which control the operation of the space bar on the typewriter.

The space bar on the typewriter is also operated to provide a blank in the space reserved for a particular digit in a measurement in case no signals pass into the counter which assimilates and stores information relating to the digit. For example, if no signals pass into the counter formed by the multivibrators 274 and 278 to 288, inclusive, a positive pulse continues to appear on the plate of the right tube in the multivibrator 288. This pulse passes through the contact 318j and the movable contact of the switch 318 and causes current to flow through the tube 346 and either the solenoid 368 or the solenoid 378 to operate the space bar on the typewriter.

By the time that the movable contact of each stepping switch has completed a full revolution, all of the information in the different counters has been typed for subsequent analysis. Thus, when the movable contact of the switch 316 returns to the stationary contact 316a for the start of a new revolution, the system shown in Figures 2A, 2B and 2C is ready to receive new sequences of signals relating to atmospheric temperature and pressure and to derive from the received signals information relating to altitude, wind direction and wind velocity. Before new information can be assimilated and stored, the circuits must be "zeroized" or, in other words, returned to their original state of operation.

"Zeroizing" occurs when the right tube in the D. C. trigger circuit 56 (Figure 2A) again starts to conduct and the left tube becomes cut off as a result of the application of ground potential to the trigger circuit through the stationary contact 316a and the movable contact of the switch 316. Cutting off the left tube in the D. C. trigger circuit 56 causes the gate circuit 164 to open for the passage of a synchronizing signal from the blocking oscillator 140. This zeroizing signal cuts off the left tube in the bistable multivibrator 166 and causes a positive pulse to be produced on the plate of the tube. The positive pulse passes in inverted form through the blocking oscillator 168 to all of the bistable multivibrators in the system. The leading edge of the inverted pulse acts upon the multivibrators to return them to their original state of operation and prepares the multivibrators for proper action in the decoding and recording of a new set of information.

There is thus provided a system for converting the periods of time between adjacent pulses in a received sequence into pluralities of signals which provide an indication of the value of the condition represented by the sequence. The system is adapted to operate on sequences of pulses relating to a plurality of different conditions and to derive from the received sequences information relating to other conditions. The system sequentially stores in a separate counter the information relating to each condition and sequentially types the information after it has been completely stored.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination at a central station, means for receiving sequences of pulses transmitted from a position removed from the central station, each sequence being indicative of the value of a different condition, a plurality of multivibrators each adapted to become energized during the period of time between a different pair of adjacent pulses in each received sequence, a plurality of oscillators each adapted to produce signals at predetermined intervals during the period in which an associated multivibrator is energized, a plurality of gate circuits each adapted to pass the signals produced by an associated oscillator, a plurality of counters each adapted to count the signals passing through an associated gate circuit and to store the information represented by the count, cyclic means operative during a predetermined portion of each cycle to make the counters available for the passage of information from their associated gate circuits, and means operative by the cyclic means after the storage of the received information to provide in sequence a record of the information representing each condition.

2. In combination at a central station, means for receiving at the central station sequences of pulses representative of different conditions at a position removed from the central station, means for deriving the values of other conditions from the received sequences of pulses, means for converting the derived information into sequences of pulses corresponding to the received sequences, a plurality of multivibrators each adapted to become energized during the period of time between a different pair of adjacent pulses in each received and derived sequence, a plurality of oscillators each adapted to produce signals at predetermined intervals during the period in which an associated multivibrator is energized, a plurality of gate circuits each adapted to pass the signals produced by an associated oscillator, a plurality of counters each adapted to count the signals passing through an associated gate circuit and to store the information represented by the count, cyclic means operative during a predetermined portion of each cycle to make the counters available for the passage of information from their associated gate circuits, and means operative by the cyclic means after the storage of the received and derived information to provide in sequence a record of the information representing each condition.

3. In combination at a central station, means for receiving sequences of pulses transmitted from a position removed from the ground station, each sequence being indicative of the value of a different condition, a first plurality of gate circuits each adapted to pass the pulses representing a particular condition, a plurality of monostable members each operative to open a different gate circuit for the passage of the pulses representing the particular condition, means for producing during the period of time between each pair of adjacent pulses in each condition a plurality of signals indicative of the time period, a second plurality of gate circuits, the gate circuits in the second plurality being separated into groups to provide for the passage of the information representing a different condition through the gate circuits in each group, each of the gate circuits in a group being adapted to pass a plurality of signals representing the period of time between a different pair of adjacent pulses, a plurality of counters each adapted to count the signals passing through an associated gate circuit in a group in the second plurality and to store the information represented by the count, cyclic means operative during a predetermined portion of each cycle to make the counters available for the passage of information from their associated gate circuits, and means operative by the cyclic means after the storage of the received information to provide in sequence a record of the information representing each condition.

4. In combination at a central station, means for receiving sequences of pulses transmitted from a position removed from the ground station, each sequence being indicative of the value of a different condition, a first plurality of gate circuits each adapted to pass the first pulse in each sequence representing a particular condition, a plurality of monostable members each operative to open a different gate circuit for the passage of the first pulse in each sequence representing the particular condition, means for producing during the period of time between each pair of adjacent pulses in each sequence a plurality of signals indicative of the time period, a second plurality of gate circuits, the gate circuits in the second plurality being separated into groups to provide for the passage of the information representing a particular condition through the gate circuits in each group, each of the gate circuits in a group being adapted to pass a plurality of signals indicative of the period of time between a different pair of adjacent pulses in each sequence representing the particular condition, a plurality of counters each adapted to count the signals passing through an associated gate circuit in the second plurality and to store the information represented by the count, a plurality of multivibrators each associated with a different one of the gate circuits in the first plurality to be triggered upon the opening of the gate circuit and associated with a different group of gate circuits in the second plurality to open the gate circuits for the passage of signals through the gate circuits, means for rejecting any pulse sequence having a different number of pulses than a predetermined number, cyclic means operative during a predetermined portion of each cycle to make the counters available for the passage of information from their associated gate circuits, and means operative by the cyclic means after the storage of the received information to provide in sequence a written record of the information representing each condition.

5. In combination at a central station, means for receiving sequences of pulses transmitted from a position removed from the central station, each sequence being indicative of the value of a different condition, a first plurality of gate circuits each adapted upon being opened to pass the first pulse in each sequence representing a particular condition, a plurality of monostable members each adapted to become activated for a period of time to open an associated gate circuit in the first plurality, a plurality of multivibrators each triggered by the first pulse in each sequence representing a particular condition, a second plurality of gate circuits arranged in groups, the gate circuits in each group being opened upon the triggering of an associated multivibrator for the passage of information, means for producing between each pair of adjacent pulses in each sequence a plurality of signals indicative of the time period, means for passing each plurality of signals through a different one of the gate circuits in the opened group, means for counting the signals passing through each gate circuit in the second plurality and for storing the information represented by the signals, a switch mechanically operative after the storage of the information relating to the different conditions to sequentially provide for the release of the information stored in the different counting means, and means for recording the stored information as it is released.

6. In combination at a central station, means for receiving sequences of pulses transmitted from a position removed from the central station, each sequence being indicative of the value of a different condition, a first plurality of gate circuits each adapted upon being opened to pass the first pulse in each sequence representing a particular condition, a plurality of monostable members each adapted to become activated for a period of time to open an associated gate circuit in the first plurality, a plurality of multivibrators each triggered by the first pulse in each sequence representing a particular condition, a second plurality of gate circuits arranged in groups, the gate circuits in each group being opened upon the triggering of an associated multivibrator for the passage of information, means for producing between each pair of adjacent pulses in each sequence a plurality of signals indicative of the time period, means for passing each plurality of signals through a different one of the gate circuits in the opened group in the second plurality, means for counting the signals passing through each gate circuit in the second plurality and for storing the information represented by the signals, means for sampling each received sequence during the time that the associated gate circuits in the second plurality are open to accept for counting and storage only a sequence for each condition having a predetermined number of pulses, means operative upon the acceptance of a pulse sequence relating to a particular condition to prevent the assimilation and storage of further sequences relating to the condition, and means operative after the storage of the information relating to the different conditions to sequentially provide a record of the value of the conditions.

7. In combination at a central station, a plurality of ganged switches, a plurality of contacts on each switch, means for establishing a continuity to successive contacts on the switches in a sequential pattern, means for receiving sequencies of pulses relating to the values of different conditions at a position removed from the central station, means for decoding the received sequences of pulses relating to the different conditions during the time that continuity is established to a first plurality of successive contacts on each switch, means for storing the decoded information relating to the different conditions during the time that continuity is established to the first plurality of successive contacts on each switch, means for making the stored information relating to the different conditions available for recordation during the time that continuity is established to a second plurality of successive contacts on each switch following the first plurality of contacts, and means for recording the stored information as it is made available during the time that continuity is established to the second plurality of successive contacts on each switch.

8. In combination at a central station, means for receiving at the central station sequences of pulses representative of different conditions at a position removed from the central station, means operative during the period between each pair of successive pulses in a sequence to produce a plurality of signals proportional to the period, a plurality of gate circuits separated into groups, means operative by the first pulse in each received sequence to direct into a predetermined group of gate circuits the pluralities of signals produced between each pair of adjacent pulses in the sequence, means for counting the number of signals in each plurality and for storing the information represented by the count, a plurality of ganged stepping switches each having a plurality of contacts, means for sequentially establishing continuity to corresponding contacts on each stepping switch, means operative during the time that continuity is established to a first plurality of successive contacts on each switch to provide for the production of the pluralities of signals and the storage of the information represented by the signals, and means for sequentially recording the information in each counting and storage means during the time that continuity is established to a second plurality of successive contacts on the stepping switches.

9. In combination at a central station, means for receiving at the central station sequences of pulses representative of different conditions at a position removed from the central station, means operative by the first pulse in each received pair of successive pulses in a sequence to produce a plurality of signals proportional to the period, a plurality of gate circuits separated into groups, means operative by the first pulse in each received sequence to direct into a predetermined group of gate circuits the pluralities of signals produced between each pair of adjacent pulses in the sequence, means for counting the number of signals in each plurality and for storing the information represented by the count, a plurality of ganged stepping switches each having a plurality of contacts, means for sequentially establishing continuity to corresponding contacts on each stepping switch, means operative during the time that continuity is established to a first plurality of successive contacts on each switch to provide for the production of the pluralities of signals and the storage of the information represented by the signals, means for preventing the decoding and storage of information relating to each condition after pluralities of signals indicative of the condition have been produced and the information represented by such pluralities of conditions have been stored, and means for sequentially recording the information in each counting and storage means during the time that continuity is established to a second plurality of successive contacts on the stepping switches.

10. In combination at a central station, means for receiving at the central station sequences of pulses representative of different conditions at a position removed from the central station, means operative during the period between each pair of successive pulses in a sequence to produce a plurality of signals proportional to the period, a plurality of gate circuits separated into groups, means operative by the first pulse in each received sequence to direct into a predetermined group of gate circuits the pluralities of signals produced between each pair of adjacent pulses in the sequence and to direct into a separate gate circuit in the group each plurality of signals in the sequence, means for counting the number of signals in each plurality and for storing the information represented by the count, a plurality of ganged stepping switches each having a plurality of contacts, means for sequentially establishing continuity to successive contacts on each stepping switch, means for sampling a plurality of pulse sequences relating to each condition during the time that continuity is established to a first plurality of successive contacts on each switch, means for accepting for decoding and storage of information the first sequence for each condition having a predetermined number of pulses in the sequence and for rejecting all subsequent sequences of pulses relating to the condition during the time that continuity is established to the first plurality of contacts on each switch, and means for recording the information in each counting and storage means during the time that continuity is established to a second plurality of successive contacts on the stepping switches.

11. In combination at a central station, means for receiving at the central station sequences of pulses representative of different conditions at a position removed from the central station, a plurality of ganged switches, a plurality of contacts on each switch, means for sequentially engaging each of the contacts on the switches, a gate circuit, a multivibrator operative during the engagement of a first plurality of successive contacts on the switches to open the gate circuit for the passage of received sequences of pulses, means for decoding the received sequences of pulses passing through the gate circuit, means for storing the decoded information indicative of the different received conditions, means operative after the engagement of the contacts in the first plurality to trigger the multivibrator into a state of operation for closing the gate circuit, means for deriving from the received sequences of pulses information relating to other conditions, means for converting the derived information into sequences of pulses corresponding to the received sequences, means for introducing the derived sequences of pulses to the decoding means upon the closure of the gate circuit, means for storing the decoded information indicative of the different derived conditions, and means for recording the stored information relating to the received and derived conditions during the engagement of a second plurality of successive contacts on the switches.

12. In combination at a central station, means for receiving sequences of pulses transmitted from a position removed from the central station, each sequence being indicative of the value of a different condition, a first plurality of gate circuits each adapted to pass the first pulse in each sequence representing a particular condition, a plurality of monostable members each adapted to become activated for a period of time to open an associated gate circuit in the first pluraltiy for the passage of the first pulse in each sequence representing the particular condition, a plurality of multivibrators each triggered by the first pulse in each sequence representing a particular condition, a second plurality of multivibrators each associated with a different multivibrator in the first plurality and triggered by its associated multivibrator into a first state of operation, a second plurality of gate circuits arranged in groups, the gate circuits in each group being opened for the passage of information upon the triggering of an associated multivibrator in the second plurality, means for producing between each pair of adjacent pulses in each sequence a plurality of signals indicative of the time period, means for passing each plurality of signals through a different one of the gate circuits in the opened group, means for counting the signals passing through each gate circuit in the second plurality and for storing the information represented by the signals, means for triggering each multivibrator in the second plurality into a second state of operation, upon the storage of information representing the particular condition operated upon by the multivibrator, to close the associated gate circuits in the second plurality against the further passage of information, means operative after the storage of the information relating to the different conditions to sequentially provide a record of the value of the conditions, and means operative upon the recordation of the information to return the multivibrators in the first and second pluralities to their original state of operation for the assimilation of new information.

13. In combination at a central station, means for receiving sequences of pulses transmitted from a position removed from the central station, each sequence being indicative of the value of a different condition, means for assimilating the received sequences, means for storing in separate channels the assimilated information representing each of the conditions in the received sequences, cyclic means operative during a predetermined portion of each cycle to open the storage means for the storage of the received information, means for sampling each received sequence during the period that the storage means are open to accept for storage only a sequence for each condition having a predetermined number of pulses, means operative upon the acceptance of a pulse sequence relating to a particular condition to prevent the assimilation and storage of further sequences relating to the condition, and means operative by the cyclic means after the storage of the received information to provide in sequence a written record of the information representing each condition.

14. In combination at a central station, means for receiving sequences of pulses transmitted from a position removed from the central station, each sequence being indicative of the value of a different condition, means for assimilating the received sequences, first means for storing in separate channels the assimilated information representing each of the conditions in the received sequences, cyclic means operative during a predetermined portion of each cycle to open the storage means for the storage of the received information, means for deriving other conditions from the received sequences of pulses, means operative by the cyclic means upon the closure of the first storage means to pass into the assimilating means the information relating to the derived conditions, second means operative by the cyclic means after the storage of the received information to store in separate channels the assimilated information representing the derived conditions, and means operative by the cyclic means after the storage of the information relating to the received and derived conditions to provide in sequence a written record of the information representing each condition.

15. In combination at a central station, means for receiving coded sequences of pulses, the pulses in each sequence being spaced from one another by periods of time indicative of the value of a different condition, a plurality of channels, means for preparing the channels for activation, means for operating on the coded sequences of pulses after the preparation of the channels to separate into the different channels the pulses relating to the different conditions, means for converting the periods of time between adjacent pulses into pluralities of signals indicative of the value of the condition represented by the pulses, means for counting the signals in each plurality and for storing the information represented by the plurality, operative after the storage of the information relating to the different conditions to sequentially release the stored information, and means for providing a record of the stored information as it is released.

16. In combination at a central station, means for receiving coded sequences of pulses, the pulses in each sequence being spaced from one another by periods of time indicative of the value of a different condition, a plurality of channels, switching means for preparing the channels for activation, means for operating on the coded sequences of pulses after the preparation of the channels to separate into the different channels the pulses relating to the different conditions, means for converting the periods of time between adjacent pulses into pluralities of signals indicative of the value of the condition represented by the pulses, means for counting the signals in each plurality and for storing the information represented by the plurality, means for deriving from the received sequences information relating to other conditions, means operative by the switching means after the storage of the information relating to the received conditions to store the information relating to the derived conditions, means for providing a printed record of the value of each condition, and means operative by the switching means after the storage of the information relating to the received and derived conditions to sequentially establish a completed circuit from each storage means to the printing means for the recordation of the information in the storage means.

17. In combination at a central station, means for receiving sequences of pulses from a position removed from the central station, each sequence being indicative of a different condition, means for converting the time periods between the different pairs of successive pulses in a sequence into pluralities of signals indicative of the value of the condition represented by the sequence, means for storing in separate channels the pluralities of signals produced between each pair of successive pulses, means for operating on the sequences of pulses to derive the values of other conditions, means for storing in separate channels information representing the values of the derived conditions, a switch mechanically operative to release in sequence the information stored in the different channels, and means for producing a record of the stored information as it is released.

18. In combination at a central station, means for receiving coded sequences of pulses, the pulses in each sequence being spaced from one another by periods of time indicative of the value of a different condition, a plurality of channels, switching means for preparing the channels for activation, means for sequentially operating on the coded sequences of pulses after the preparation of the channels to separate into the different channels the pulses relating to the different conditions, the channeling means also being operative to prevent the passage of further pulse sequences into the channels until the utilization or elimination of the information represented by the channeled pulse sequence, means for converting the periods of time between adjacent pulses in the channeled sequence into pluralities of signals indicative of the value of the condition represented by the pulses, means for counting the signals in each plurality and for storing the information represented by the plurality, means for eliminating the information represented by a pulse sequence having a plurality of pulses different from a predetermined number and for restoring the channeling means and the counting means to their original condition for operation on a subsequent pulse sequence indicative of the same condition as the eliminated sequence, means for providing a printed record of the value of each condition, and means operative by the switching means after the storage of the information relating to the different conditions to sequentially establish a completed circuit from each storage means to the printing means for the recordation of the information in the storage means.

19. In combination at a central station, means for receiving sequences of pulses relating to the values of predetermined conditions at a position removed from the central station, means for decoding the received sequences of pulses, first means for storing the decoded information relating to the received sequences of pulses, means for deriving the values of other conditions from the received sequences of pulses, second means for storing the decoded information relating to the derived conditions, switching means operative to open in sequence the first and second storage means for the reception of decoded information, and means operative after the storage of the received and derived information to provide in sequence a printed record giving the values of the different conditions.

20. In combination at a central station, means for receiving sequences of pulses relating to the values of predetermined conditions at a position removed from the central station, means for deriving the values of other conditions from the received sequences of pulses, means for converting the derived sequences into sequences of pulses similar to the received sequences, means for decoding the received and derived sequences of pulses, first means for storing the decoded information relating to the received sequences of pulses, second means for storing the decoded information relating to the derived sequences of pulses, switching means operative on a recurrent basis to sequentially open the first and second storage means for the reception of decoded information, and means controlled by the operation of the switching means to provide in sequence a printed record of the value of each condition.

21. In combination at a central station, a plurality of ganged switches, a plurality of contacts on each switch, means for sequentially engaging each of the contacts on the switches, means for receiving coded sequences of pulses indicative of the values of particular conditions at a position removed from the central station, means for decoding the received sequences of pulses, means for storing the decoded information indicative of the different conditions, means operative upon the engagement of a first plurality of successive contacts on the switches to establish a continuous circuit from the decoding means to each of the storage means for the storage in sequence of the information indicative of the different conditions, means for recording the information in the storage means, and means operative upon the engagement of a second plurality of successive contacts of the switch following the first plurality of contacts to establish a continuous circuit in sequence from each of the storage means to the recording means for the recordation of the decoded information.

22. In combination at a central station, a plurality of ganged switches, a plurality of contacts on each switch, means for sequentially engaging each of the contacts on the switches, means for receiving coded sequences of pulses indicative of the values of particular conditions at a position removed from the central station, means for decoding the received sequences of pulses, means for directing into separate channels the decoded information relating to each condition, means associated with each channel for storing the decoded information passing through the channel, means operative upon the engagement of a first plurality of successive contacts on the switches to prepare the channeling means for the passage of the decoded information into the associated storage means, means operative in accordance with coded information provided by each pulse sequence after the preparation of the channeling means to open a predetermined channeling means for the passage of the decoded information relating to a particular condition into the associated storage means, means for recording the information in the storage means, and means operative upon the engagement of a second plurality of successive contacts of the switch following the first plurality of contacts to establish a continuous circuit in sequence from each of the storage means to the recording means for the recordation of the desired information.

23. In combination at a central station, a plurality of ganged switches, a plurality of contacts on each switch, means for sequentially engaging each of the contacts on the switches, means for receiving coded sequences of pulses indicative of the values of particular conditions at a position removed from the central station, means for decoding the received sequences of pulses, means for storing the decoded information indicative of the different conditions, means for deriving from the received sequences of pulses information relating to other conditions, means for storing the derived information, means operative upon the engagement of first contacts on the switches to establish a continuous circuit from the decoding means to each of the storage means for the storage in sequence of the information indicative of the different conditions, means for recording the information stored in the storage means, and means operative upon the engagement of second contacts on the switches to establish a continuous circuit in sequence from each of the storage means to the recording means for the recordation of the decoded information.

24. In combination at a central station, means for receiving sequences of pulses from a position removed from the central station, each sequence of pulses being indicative of a different condition, means for converting the time periods between the different pairs of successive pulses in a sequence into pluralities of signals indicative of the value of the condition represented by the sequence, means for storing in separate channels the pluralities of signals produced between each pair of successive pulses, means for operating on the sequences of pulses to derive the values of other conditions, means for converting each of the derived measurements into a sequence of pulses indicative of the measurement, means for introducing each of the derived pulse sequences into the conversion means to produce pluralities of signals indicative of the spacing between successive pairs of pulses, means for storing in separate channels the pluralities of signals produced between each pair of successive pulses in a derived sequence, and a switch mechanically operative to release in sequence the information stored in the different channels to produce a printed record of the information.

25. In combination at a central station, means for receiving sequences of pulses from a position removed from the central station, each sequence of pulses being indicative of a different condition, means for converting the time periods between the different pairs of successive pulses in a sequence into pluralities of signals indicative of the value of the condition represented by the sequence, means for storing in separate channels the pluralities of signals produced between each pair of successive pulses, means at the central station for operating on the sequences of pulses to derive the values of other conditions, means for converting each of the derived measurements into a sequence of pulses indicative of the measurement, means for introducing each of the derived pulse sequences into the conversion means to produce pluralities of signals indicative of the spacing between successive pairs of pulses, means for storing in separate channels the pluralities of signals produced between each pair of successive pulses in a derived sequence, a typing circuit operative to provide a written record of the information stored in each channel, and a plurality of stepping switches operative to provide in sequence a completed circuit between each storage channel and the typing circuit for the release of the information in the channel to the typing circuit.

26. In combination at a central station, means for receiving sequences of pulses from a position removed from the central station, each sequence of pulses being indicative of a different condition, means for deriving measurements relating to other conditions from the received sequences of pulses, means for converting each derived measurement into a sequence of pulses similar to the received sequences of pulses, means for converting the period of time between each pair of successive pulses in a sequence into a plurality of signals indicative of the time period, means for successively introducing each of the pulse sequences into the conversion means, means for introducing into a separate channel the output signals produced by the conversion means between each pair of pulses in a sequence, means for counting and storing the signals in each channel, means for providing a written record of the information in each counter, and a switch mechanically operative to sequentially activate each storage means to provide for the passage of the information in the storage means to the recording means.

27. In combination at a central station, means for receiving sequences of pulses from a position removed from the central station, each sequence of pulses being indicative of a different condition, means for deriving measurements relating to other conditions from the received sequences of pulses, means for converting the period of time between each pair of successive pulses in a sequence into a plurality of signals indicative of the time period, means for successively introducing each of the pulse sequences into the conversion means, means for introducing into a separate channel the output signals produced by the conversion means between each pair of pulses in a sequence, means for counting and storing the signals in each channel, means for checking the number of signals in each sequence passing through the conversion means, means for eliminating the signals in the storage means providing an indication of a pulse sequence which has a number of pulses differing from a predetermined value, means for providing a written record of the information in each counter, and a switch having a plurality of contacts for sequentially activating each storage means to provide for the passage of the information in the storage means to the recording means.

28. In combination at a central station, means for receiving at the central station sequences of pulses representative of different conditions at a distant position, means for deriving from the received sequences of pulses information relating to other conditions at the distant position, means operative during the period between each pair of successive pulses in a sequence to produce a plurality of signals proportional to the period, means operative by the first pulse in each received sequence to direct into predetermined channels the pluralities of signals produced between each pair of pulses in the sequence, means operative upon the passage of the received information into their predetermined channels to convert the derived information into sequences of pulses similar to the received sequences, means for successively directing the derived sequence of pulses into the means for producing pluralities of signals, means for directing into predetermined channels the pluralities of signals representative of the derived pulse sequences, means for sequentially releasing the information stored in the different channels, and means for providing a written record of the channeled information as it is released.

29. In combination at a central station, means for receiving at the central station sequences of pulses representative of different conditions at a distant position, means for deriving from the received sequences of pulses information relating to other conditions at the distant position, means operative during the period between each pair of successive pulses in a sequence to produce a plurality of signals proportional to the period, a stepping switch, means operative at predetermined positions of the stepping switch to direct the received pulse sequences into the conversion means, means operative by the first pulse in each received sequence to direct into predetermined channels the pluralities of signals produced by the conversion means, means operative at other positions of the stepping switch to convert the derived information into sequences of pulses similar to the received sequences and to direct the derived pulse sequences into the conversion means, means for directing into predetermined channels the pluralities of signals representative of the derived pulse sequences, means operative by the stepping switch after the conversion of the received and derived information to sequentially release the information stored in the different channels, and means for providing a written record of the channeled information as it is released.

30. In combination at a central station, a plurality of ganged stepping switches, each stepping switch having a plurality of positions, means for receiving sequences of pulses relating to the values of different conditions at a position removed from the central position, means operative at first positions of the stepping switches to convert the period of time between each pair of successive pulses in a sequence into a plurality of signals proportional to the period, means for converting the received pulse sequences into measurements relating to the values of derived conditions at the removed position, means operative at second positions of the stepping switches to convert the derived measurements into sequences of pulses similar to the received sequences, the signal-producing means being operative to convert the time period between each pair of pulses in a sequence into a plurality of signals proportional to the period, means for providing a written record of the information from the conversion means, and means operative at positions of the stepping switches successive to the first and second positions to introduce the information from the conversion means to the recording means.

References Cited in the file of this patent

UNITED STATES PATENTS

| Number | Name | Date |
| --- | --- | --- |
| 2,207,743 | Larson | July 16, 1940 |
| 2,443,198 | Sallach | June 15, 1948 |
| 2,457,819 | Hoeppner | Jan. 4, 1949 |
| 2,468,703 | Hammel | Apr. 26, 1949 |
| 2,524,832 | Paylo | Oct. 10, 1950 |
| 2,537,056 | Hoeppner | Jan. 9, 1951 |